(12) United States Patent
Nomi et al.

(10) Patent No.: US 7,070,500 B1
(45) Date of Patent: *Jul. 4, 2006

(54) MUSICAL PLAYER-MOTION SENSING GAME SYSTEM

(75) Inventors: Mitsuhiro Nomi, Kobe (JP); Satoshi Ueno, Kobe (JP); Yasuhiro Noguchi, Kobe (JP)

(73) Assignee: Konami Corporation, Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/655,511

(22) Filed: Sep. 5, 2000

(30) Foreign Application Priority Data

Sep. 7, 1999 (JP) .................................. 11-253685

(51) Int. Cl.
 *A63F 13/00* (2006.01)
(52) U.S. Cl. ............................................. 463/7; 463/37
(58) Field of Classification Search ................... 463/1, 463/7–8, 23, 36–37, 43–45, 47; 273/148 B, 273/459–460; 702/33, 41, 57, 104, 141–142; 434/258–261
See application file for complete search history.

(56) References Cited

U.S. PATENT DOCUMENTS

| D277,238 S | | 1/1985 | Cass | |
|---|---|---|---|---|
| 4,613,139 A | * | 9/1986 | Robinson, II | ........... 273/148 B |
| 4,824,107 A | | 4/1989 | French | |
| 4,991,850 A | | 2/1991 | Wilhlem | |
| 5,056,783 A | | 10/1991 | Matcovich et al. | |
| 5,221,088 A | | 6/1993 | McTeigue et al. | |
| 5,229,756 A | * | 7/1993 | Kosugi et al. | ............... 340/706 |
| 5,233,544 A | | 8/1993 | Kobayashi | |
| 5,288,078 A | * | 2/1994 | Capper et al. | ........... 273/148 B |
| 5,329,276 A | | 7/1994 | Hirabayashi | |
| 5,354,057 A | | 10/1994 | Pruitt et al. | |
| 5,478,073 A | | 12/1995 | Hackman | |
| 5,488,362 A | * | 1/1996 | Ullman et al. | ................. 341/20 |
| 5,516,105 A | * | 5/1996 | Eisenbrey et al. | ...... 273/148 B |
| 5,616,078 A | * | 4/1997 | Oh | ................................. 463/8 |
| 5,718,639 A | | 2/1998 | Bouton | ........................ 473/151 |
| 5,733,193 A | | 3/1998 | Allard et al. | ................... 463/8 |
| 5,737,505 A | | 4/1998 | Shaw et al. | |
| 5,741,182 A | | 4/1998 | Lipps et al. | ................... 463/36 |
| 5,764,164 A | * | 6/1998 | Cartabiano et al. | ........... 341/22 |
| 5,769,719 A | * | 6/1998 | Hsu | ............................. 463/37 |
| 5,790,102 A | * | 8/1998 | Nassimi | ...................... 345/163 |

(Continued)

FOREIGN PATENT DOCUMENTS

EP          0903169          3/1999

(Continued)

*Primary Examiner*—Scott Jones
(74) *Attorney, Agent, or Firm*—Jordan and Hamburg LLP

(57) ABSTRACT

In a game system 1, instruction marks corresponding to sounds constituting part of a music number are displayed on a monitor 3, and a game player plays a game by operating a signal generating device 5 by at least one of a hitting motion and a swinging motion at specified timings based on the displayed instruction marks. The game system 1 is provided with a display means for successively renewably displaying the instruction marks on a display screen of the monitor 3, a signal generator provided in the signal generating device 5 for generating a signal when the signal generating device is operated by the above motion, an evaluating means for evaluating a game result based on a generation timing of the signal, and a sound generating means for outputting at least the background sounds.

29 Claims, 22 Drawing Sheets

U.S. PATENT DOCUMENTS

| | | | |
|---|---|---|---|
| 5,796,354 A * | 8/1998 | Cartabiano et al. ............ 341/22 |
| D411,582 S * | 6/1999 | Muraki et al. ............. D21/325 |
| 5,913,727 A * | 6/1999 | Ahdoot ........................ 463/39 |
| 6,005,548 A | 12/1999 | Latypov et al. |
| 6,025,830 A * | 2/2000 | Cohen ........................ 345/156 |
| 6,030,290 A * | 2/2000 | Powell ........................ 463/36 |
| 6,086,478 A * | 7/2000 | Klitsner et al. ............... 463/35 |
| 6,135,450 A | 10/2000 | Huang et al. |
| 6,141,643 A * | 10/2000 | Harmon ...................... 704/271 |
| 6,162,123 A * | 12/2000 | Woolston .................... 463/37 |
| 6,183,365 B1 * | 2/2001 | Tonomura et al. ........... 463/36 |
| 6,224,493 B1 | 5/2001 | Lee et al. |
| 6,669,563 B1 * | 12/2003 | Kitami et al. ................ 463/36 |
| 2003/0199316 A1 | 10/2003 | Miyamoto et al. |

FOREIGN PATENT DOCUMENTS

| | | |
|---|---|---|
| GB | 0903169 A2 * | 3/1999 |
| JP | 10293646 | 11/1988 |
| JP | 02-209169 | 8/1990 |
| JP | 6-198075 | 7/1994 |
| JP | 07-024143 | 1/1995 |
| JP | 8-84858 | 4/1996 |
| JP | 9-152934 | 6/1997 |
| JP | 11-3160 | 1/1999 |
| JP | 11-151380 | 6/1999 |
| JP | 11156050 | 6/1999 |
| JP | 11-197360 | 7/1999 |
| TW | 356429 | 4/1999 |
| WO | WO97/46888 | 12/1997 |

* cited by examiner

FIG.10

| MONKEY | MONKEY SOUND |
|---|---|
| FUNKY | FUNKY SOUND |
| WOMAN | FEMALE SOUND |
| NORMAL | NONE |
| MAN | MALE SOUND |
| HUSKY | HUSKY SOUND |
| MONSTER | MONSTER SOUND |
| ROBOT | ROBOT SOUND |

| ORDER OF SOUND GENERATION | KINDS OF SOUND MODULATION | MODULATION BY SLIDER |
|---|---|---|
| SOUND DATA BLOCK 1 | NONE | CAN BE ADDED |
| SAMPLING DATA B | × MODULATION 1 | CAN BE ADDED |
| SAMPLING DATA A | × MODULATION 3 | CAN BE ADDED |
| SOUND DATA BLOCK 4 | NONE | CAN BE ADDED |
| SAMPLING DATA A | × MODULATION 1 | CAN BE ADDED |

MUSICAL PLAYER-MOTION SENSING GAME SYSTEM

BACKGROUND OF THE INVENTION

The present invention relates to a novel game system in which a game player moves his hands to make hitting and swinging motions.

There have been various kinds of game systems described in the art. In particular, a game system is known in which a game player moves his hands as described above for playing a so-called "Drum Game", which game system includes a plurality of drums and light sources provided for the respective drums for instructing a drum to be beaten. This game is played by beating the drums, light sources of which are turned on by sticks.

However, in the above "Drum Game", the game player beats the drums by the sticks only by moving his hands forward, backward, leftward and rightward, and is not required to move very much since the drums are fixed in specified positions. Therefore, although this game is interesting to a certain degree, it still lacks sufficient variety and diversity.

It is therefore an object of the present invention to provide a game system having improved variety and diversity which requires a game player to move his hands while moving his body.

SUMMARY OF THE INVENTION

In order to achieve the above object, a game system according to the present invention comprises a signal generating device which can be held by a game player for use in applying hitting motion or a swinging motion, the signal generating device including a signal generating unit for generating a signal in response to the hitting motion or the swinging motion; a display unit having a display screen for displaying and successively renewing as instruction of motion on the display screen, an evaluating unit for evaluating a game result based on a generation timing of the signal, and a sound generating unit for outputting at least a background sound.

With this game system, since the game player operates the signal generating device by at least one of the hitting and swinging motions in response to the instruction of motion displayed on the display screen, he is required to time his motion with the display of the instruction and can play the game while freely moving near and around the game system. Furthermore, since the instructions of motion are successively renewed, he/she is required to prepare for a next motion timing. In addition, the game result reflects whether or not the timing of motion made by the player coincides with the display of the instruction. Therefore, the game played in this game system can be made to be highly interesting and enjoyable.

These and other objects, features and advantages of the present invention will become more apparent upon a reading of the following detailed description and accompanying drawings.

BRIEF DESCRIPTION OF THE DRAWINGS

FIG. 10 is a list showing types of sound modulation and a selecting method of the sound modulation type by a slide switch provided in the game system.

DETAILED DESCRIPTION OF THE INVENTION

One embodiment of the invention is now specifically described with reference to the figures.

Figure 1:
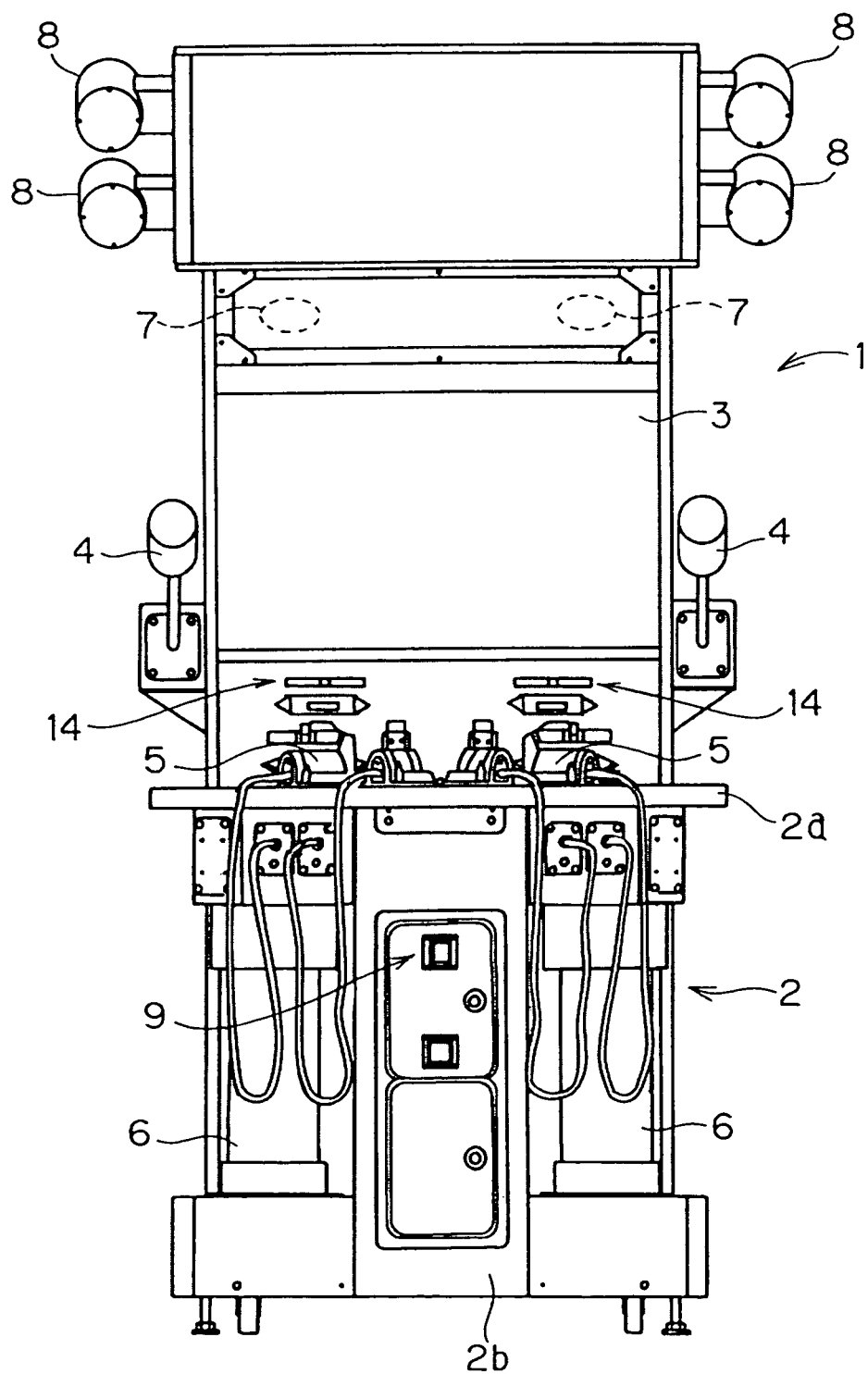
FIG. 1 is a front view of a game system according to one embodiment of the invention.
Figure 2:
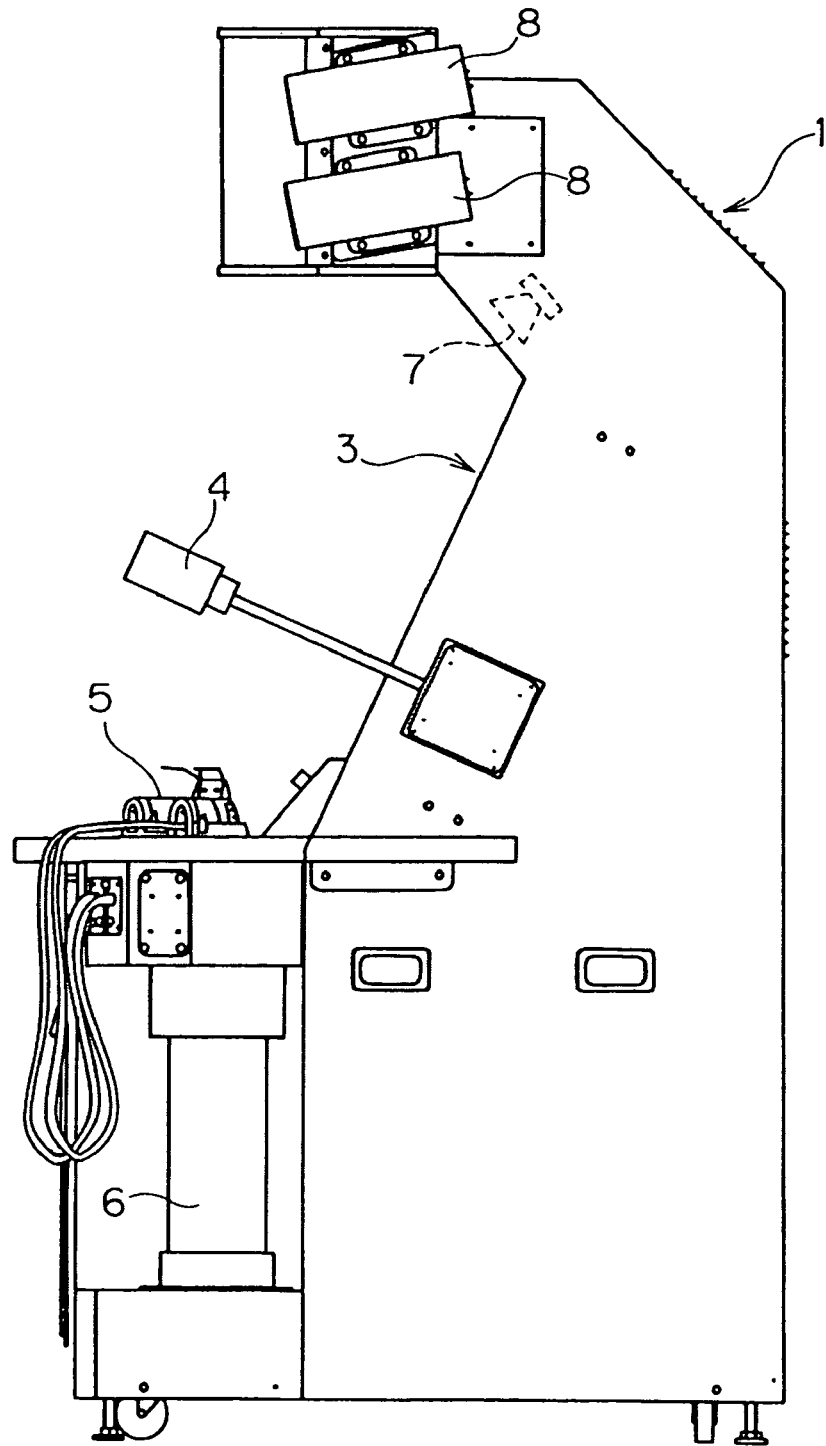
FIG. 2 is a right side view of the game system.

FIGS. 1 and 2 are a front view and a right side view of a game system according to this embodiment, respectively. In this embodiment, description is given based upon an example in which two players compete each other by hitting and swinging motions.

A game system 1 is provided with a base table 2, a television (TV) monitor 3 provided on the base table 2 for displaying game contents, microphones 4 provided at the opposite sides of the TV monitor 3 used for inputting voices, four signal generating devices 5 placed on a placing portion 2a projecting forward at the top of the base table 2, woofer loudspeaker units 6 provided inside the opposite side portions of the base table 2, a loudspeaker 7 designed for the entire frequency band and provided above the TV monitor 3, illumination-effect lamps 8 provided above the loudspeaker 7, a coin inserting device 9 provided on a front surface 2b of the base table 2, two switch operation units 14 provided in left and right positions of the front surface 2b, and a control system 40 to be described later which is provided inside the game system 1.

Figure 3:
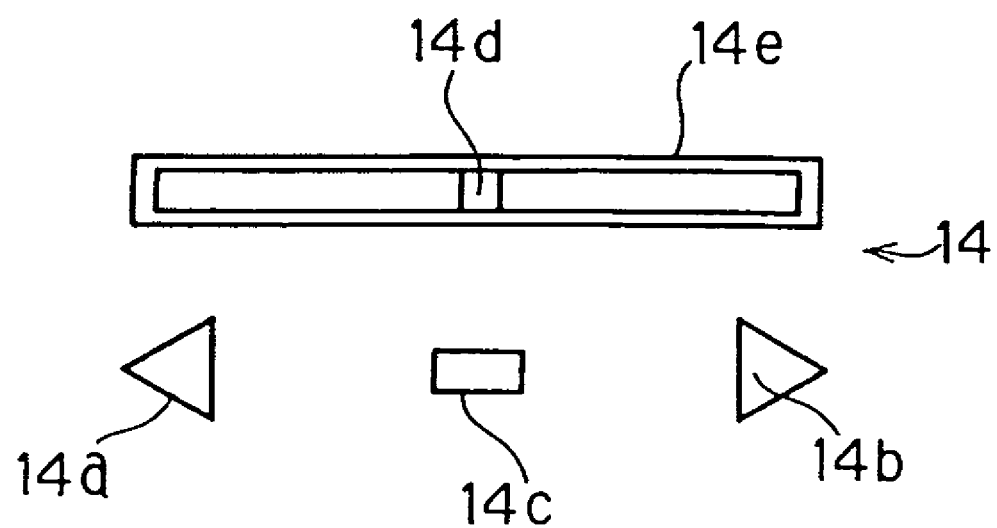
FIG. 3 is a front view showing a switch operation unit provided in the game system.

Each switch operation unit 14 is, as shown in FIG. 3, comprised of three operation buttons 14a, 14b, 14c and one slide switch 14d. The triangular operation buttons 14a and 14b provided at the opposite sides of the rectangular operation button 14c are pressed to select a musical number (background sound) and a degree of difficulty of a game based on a sound output from the loudspeaker 7 and a content of an image displayed on the TV monitor 3. This operation button 14c is also used to decide whether a single-player game or a dual-player game is to be played. For example, the single-player game is selected when the operation button 14c of the switch operation unit 14 provided at the left side of the front surface 2b is activated, whereas the dual-player game is selected when the operation button 14c of the switch operation unit 14 provided at the right side of the front surface 2b is activated. It is assumed that the operation buttons 14a, 14b and 14c of the left switch operation unit 14 on the front surface 2b are operated in the case that the single-player game is selected, and the operation buttons 14a, 14b and 14c of the left and right switch operation units 14 are operated in the case that the dual-player game is selected. The slide switch 14d provided at an upper part of each switch operation unit 14 is adapted to change types of sound modulation, as described below, by being slid to the left and right, and a gauge portion 14e is provided around a slidable range of the slide switch 14d.

Figure 4:
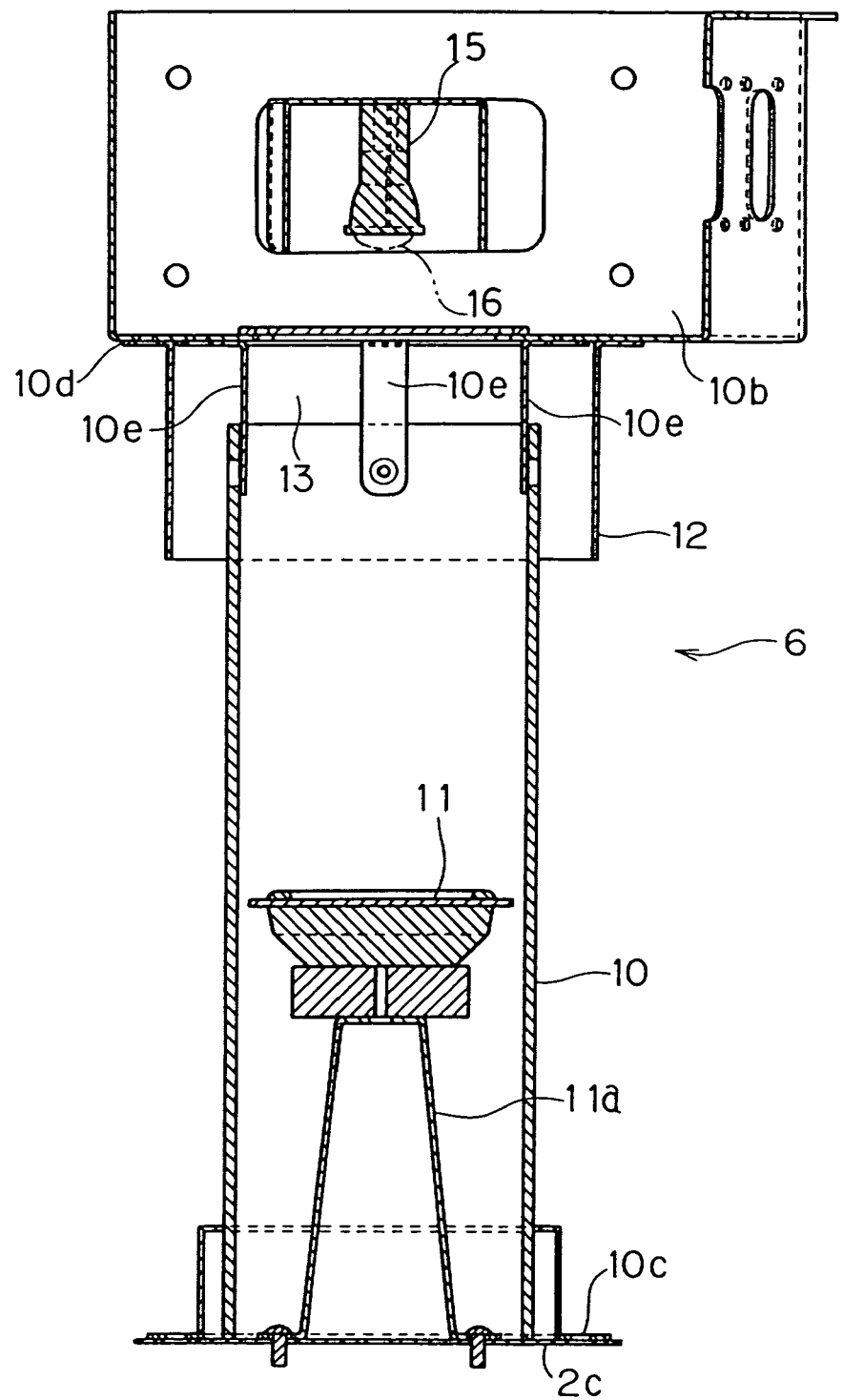
FIG. 4 is a front view in section showing a woofer loudspeaker provided in the game system.

Each loudspeaker unit 6 includes, as shown in FIG. 4, a box-shaped mount portion 10b which is mounted inside the front surface 2b of the base table 2 and has an entirely open ceiling surface and a bottom surface open in its center, a transparent tubular body 10 having a circular cross section and suspended from the mount portion 10b via L-shaped supporting members 10e, a woofer loudspeaker 11 which is so provided inside the tubular body 10 via a supporting member 11a as to face upward, and a mount portion 10c on which the supporting member 11a is mounted and which is mounted on a bottom plate 2c of the base table 2.

The tubular body 10 is coupled to the mount portion 10b by mounting the L-shaped supporting members 10e in four positions along a bottom surface 10d of the mount portion 10b, to thereby support the tubular body 10. A clearance 13 is formed between the upper edge of the tubular body 10 and the bottom surface 10d so as to permit sounds created by the speaker 11 to be emanated. A tubular member 12 having a circular cross section is mounted on the bottom surface 10d in such a manner as to surround an upper part of the tubular body 10, and the sounds from the loudspeaker 11 emanating through the clearance 13 propagate downward inside the tubular member 12 to exit therefrom. Inside the mount portion 10b is provided a light source mount portion 15, in which a light source 16 is mounted. Light from this light source 16 is guided down through an opening in the center of the bottom wall of the mount portion 10b to illuminate the speaker 11 and its neighboring members.

Figure 5:
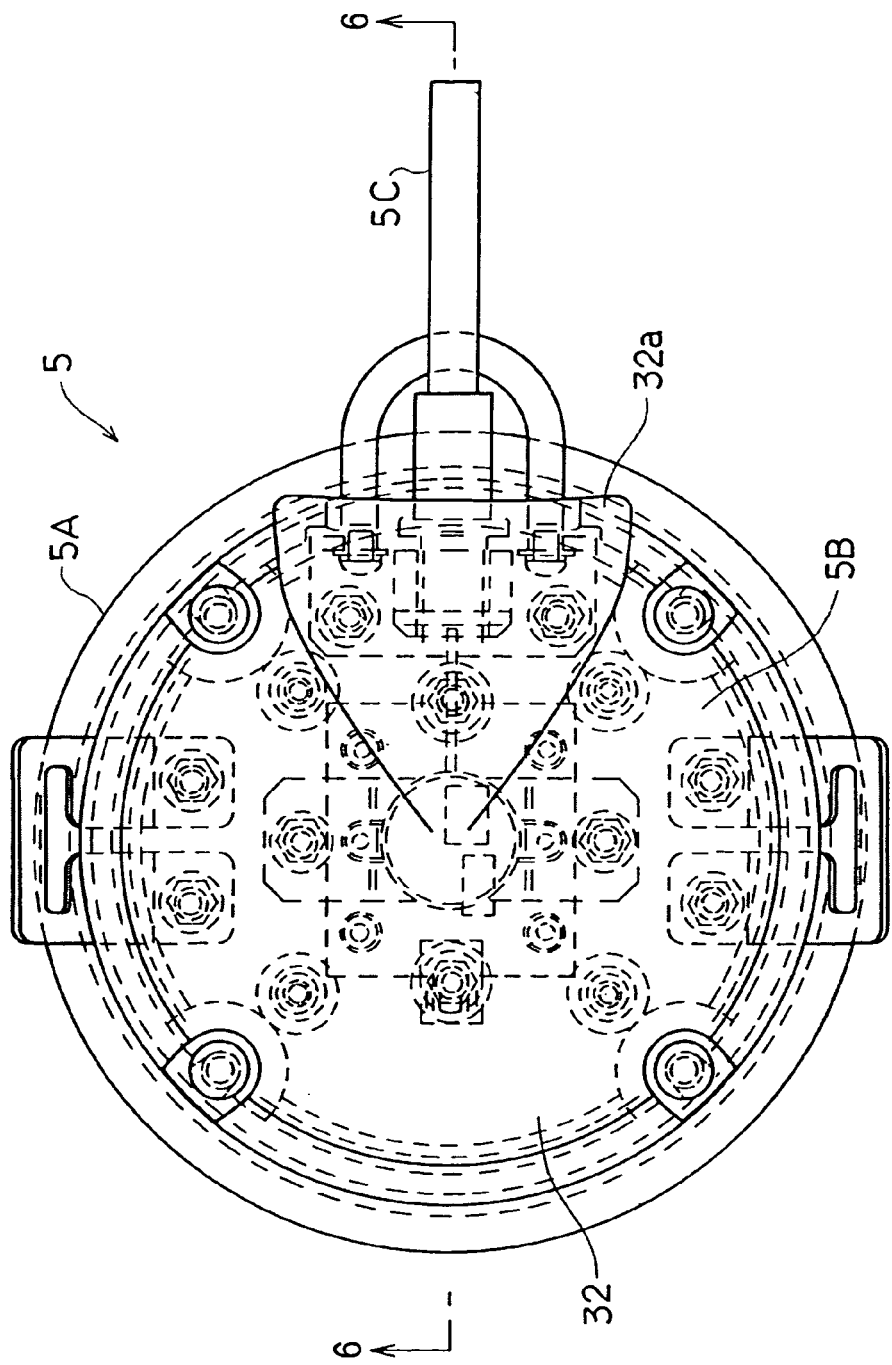
FIG. 5 is a plan view showing a signal generating device provided in the game system.
Figure 6:
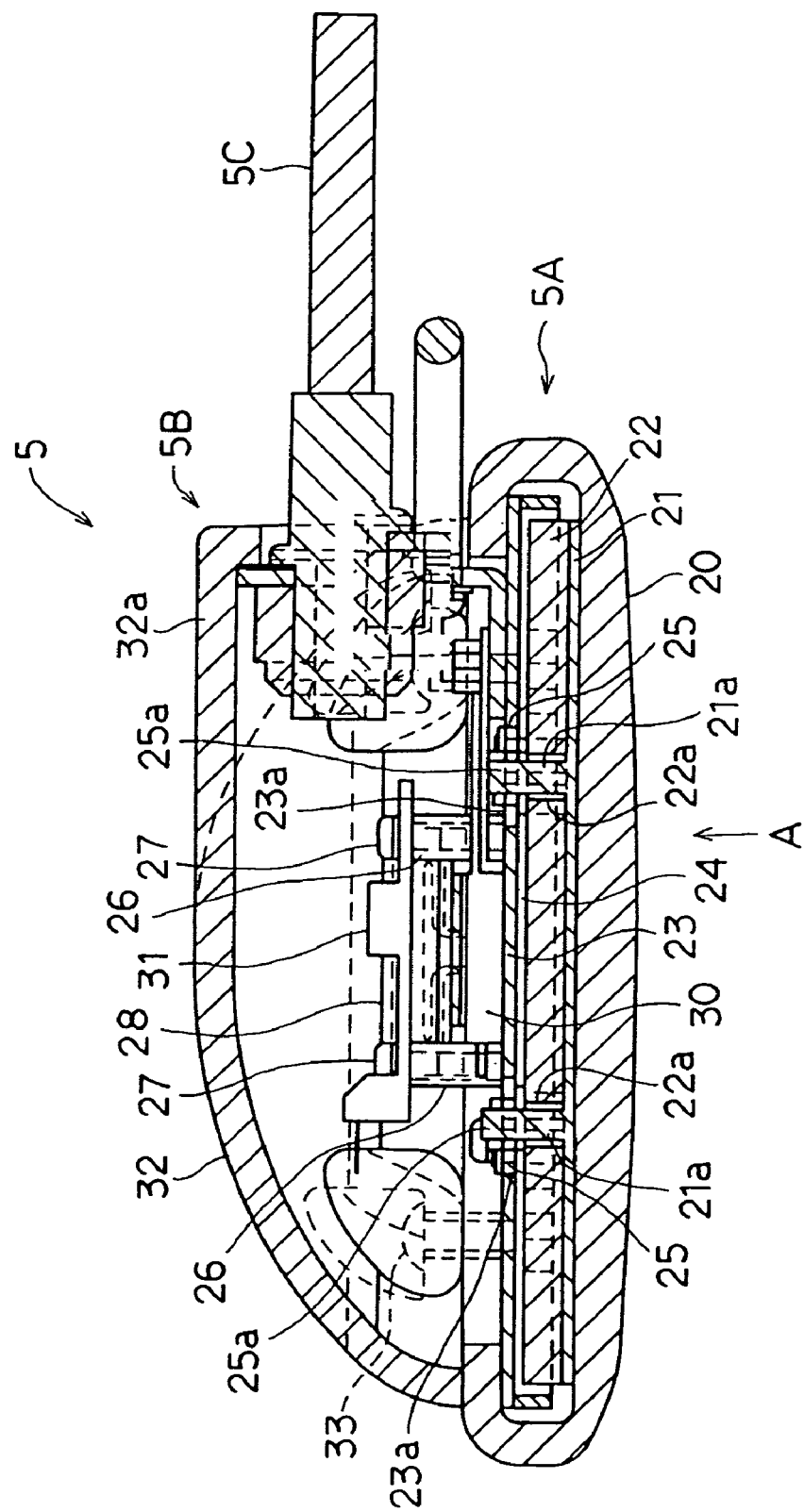
FIG. 6 is a section along 6—6 of FIG. 5.
Figure 7:
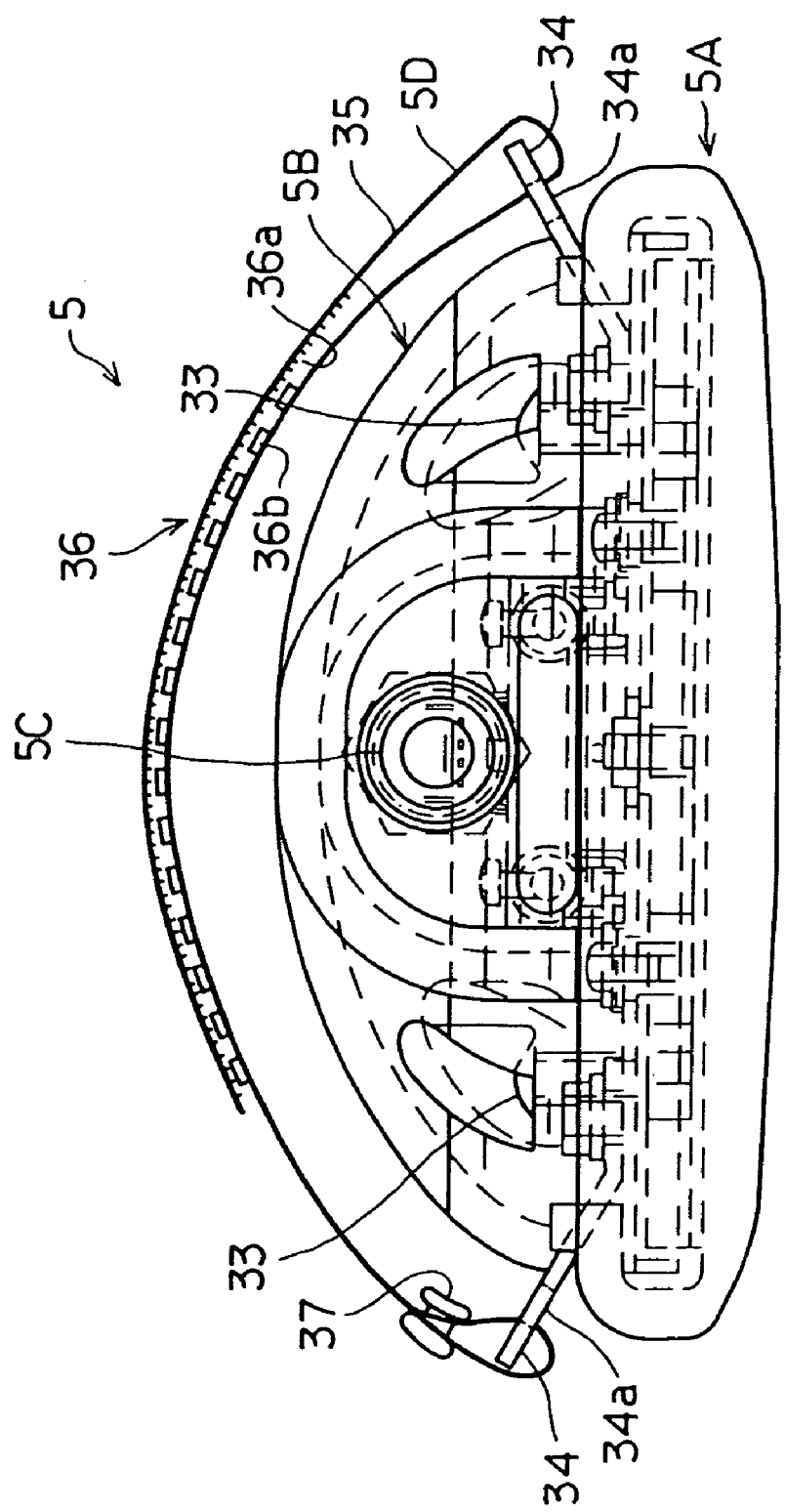
FIG. 7 is a right side view of the signal generating device.

FIG. 5 is a plan view showing the signal generating device 5, FIG. 6 is a section along 6—6 of FIG. 5, and FIG. 7 is a right side view of the signal generating device 5.

The signal generating device 5 includes a lower part 5A, an upper part 5B, a cord 5C and a belt 5D. A circular member comprised of four layers: i.e. first to third layers 20, 21, 22 placed one over another in this order, and a fourth layer 23 provided above the third layer 22 with a space 24 defined therebetween, is provided in the lower part 5A. The second layer 21 is comprised of a metal plate, and tubular portions 21a projecting upward are formed in four positions along the upper surface thereof. The third layer 22 is made of, e.g. a circular resin plate and is formed with through holes 22a in four positions corresponding to the tubular portions 21a. The fourth layer 23 is made of, e.g. a metal plate, and is formed with through holes 23a in four positions corresponding to the tubular portions 21a. The tubular portions 21a penetrate through the through holes 22a, 23a, and screws 25a having heads of a larger diameter than the through holes 22a, 23a are mounted into the tubular portions 21a from above to form the second to fourth layers 21, 22 and 23 into a unit. In addition, ring-shaped spacers 25 for ensuring the space 24 are provided between the third and fourth layers 22, 23 while having the tubular portions 21a inserted through holes formed inside them. The spacers 25 are preferably made of, e.g. a foamed urethane or like soft material which can be restored to its original shape.

The first layer 20 is fitted on such a disk-shaped unit of the second to fourth layers 21, 22, 23 while covering the upper periphery, the entire side and bottom surfaces thereof. The bottom surface of the first layer 20 serves as a hitting surface A for hitting a body of a game player, members near him or the like. The first layer 20 is made of rubber or like elastic material in order to alleviate an impact.

Four tubular members 26 stand on the upper surface of the fourth layer 23. These tubular members 26 are mounted by inserting screws 27 into through holes formed inside the tubular members 26 from above and engaging the leading ends of the screws 27 into screw holes (not shown) formed in the fourth layer 23. Four corners of a printed circuit board 28 are tightly held between the four tubular members 26 and the heads of the screws 27. Specifically, through holes having a smaller diameter than the tubular members 26 and the heads of the screws 27 are formed at the four corners of the printed circuit board 28, and the shafts of the screws 27 are inserted into these through holes to hold the printed circuit board 28. An acceleration sensor 31 for detecting a swinging motion is provided on the upper surface of the printed circuit board 28, whereas an impact sensor 30 for detecting a hitting motion is provided on the upper surface of the fourth layer 23.

The upper part 5B provided on the lower part 5A includes a substantially semispherical cover 32, and an upper portion of the cover 32 partly projects to form a projecting portion 32a. The cord 5C is drawn out through the projecting portion 32a. An other end of the cord 5C is coupled to the front surface 2b of the base table 2 (see FIG. 1). The bottom surface of the cover 32 is held in contact with the upper end of the first layer 20 of the lower part 5A and is coupled to the lower part 5A via four screws 33.

Belt fixing members 34 are provided in two positions of the cover 32, and the belt 5D is mounted in mount holes 34a formed in the belt fixing devices 34. The belt 5D includes a belt main body 35 and a surface fastener 36 having hooks 36a at one side and loops 36b at the other side. The belt main body 35 is an elongated strip, and one side thereof is introduced through one mount hole 34a and folded and has its overlapping portion fastened by a locking member 37, whereas the other side thereof is instructed through the other mount hole 34a and folded and has the surface fastener 36 mounted on its overlapping portion. By adjusting an overlapping area of the surface fastener 36, the signal generating device 5 can be securely fixed to a game player's hand regardless of the size of his hand, i.e. regardless of whether the game player is a child or an adult.

The impact sensor 30 takes advantage of a piezoelectric effect of a piezoelectric material using a ferroelectric substance. Directions in which the piezoelectric material elongates and contracts are assumed to be detecting directions. The impact sensor 30 is provided such that the detecting directions are normal to the fourth layer 23 and a detecting surface is in contact with the fourth layer 23.

On the other hand, the acceleration sensor 31 is adapted to output with respect to an X-axis and a Y-axis and is provided such that directions of the X- and Y-axes which are detecting directions are parallel to the bottom surface of the first layer 20 serving as the hitting surface A. Accordingly, the detecting directions of the acceleration sensor 31 are normal to the detecting directions of the impact sensor 30. The detecting directions of the acceleration sensor 31 and those of the impact sensor 30 may not be necessarily normal to each other. In other words, the detecting directions of the impact sensor 30 may obliquely intersect with the fourth layer 23 or the directions of the X- and Y-axes which are the detecting directions of the acceleration sensor 31 may be inclined with respect to the bottom surface of the first layer 20.

Detection signals of the impact sensor 30 and the acceleration sensor 31 are sent to the control system 40 for executing a game via the cord 5C.

Figure 8:
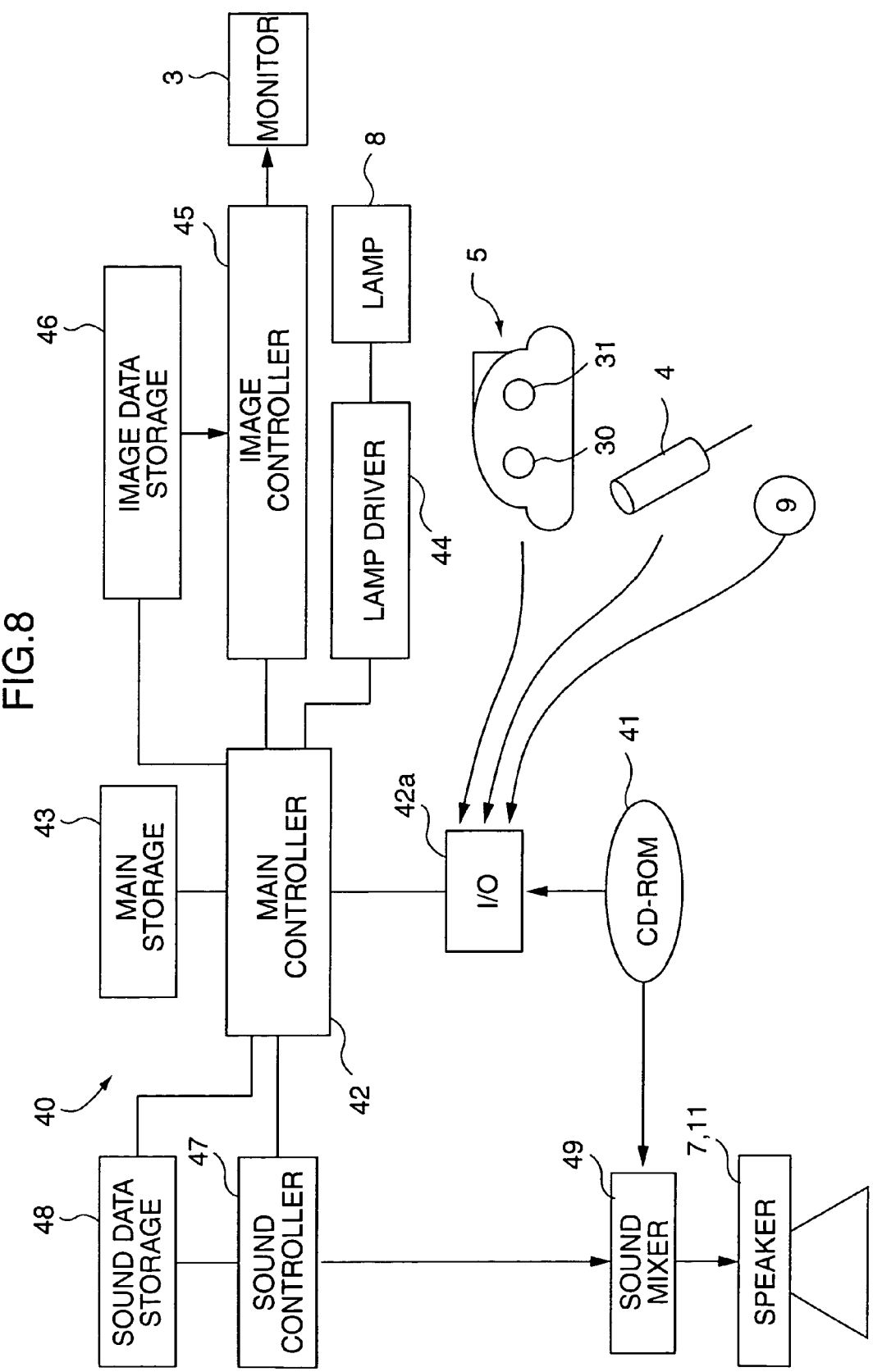
FIG. 8 is a block diagram showing the construction of a control system provided in the game system.

FIG. 8 is a block diagram showing the construction of the control system 40.

The control system 40 executes the game in accordance with a game program stored in a CD-ROM 41 as a storage medium and includes a microprocessor as a main component which provides a main controller 42, an image controller 45, a sound controller 47, a main storage 43 as a storage for the main controller 42, etc., an image data storage 46, a sound data storage 48, and a lamp driving device 44 for executing a processing necessary to turn on and off the lamps 8 in response to a command from the main controller 42.

Image data stored in the CD-ROM 41 are stored in the image data storage 46. The image controller 45 reads the image data from the image data storage 46 and outputs them to the monitor 3 at specified timings. FIGS. 9, 11 to 18 show the contents of images displayed on the monitor 3.

Figure 9:
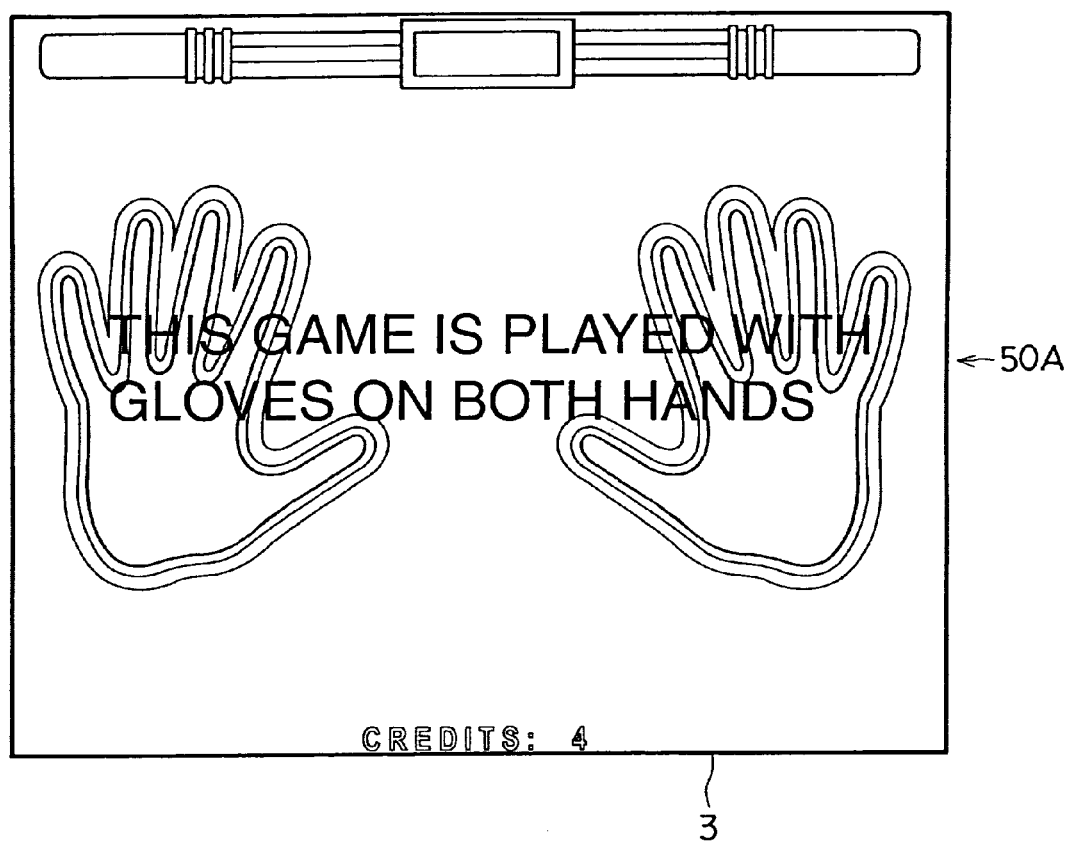
FIG. 9 is a diagram showing a content of an image (display content at the time of start) displayed on a monitor provided in the game system.

FIG. 9 shows a display contents at the start. Identified by 50A is a display showing a contents of explanation given at the start of the game. It should be noted that the printed word "GLOVES" in FIG. 9 refers to the signal generating devices 5.

Figure 11:
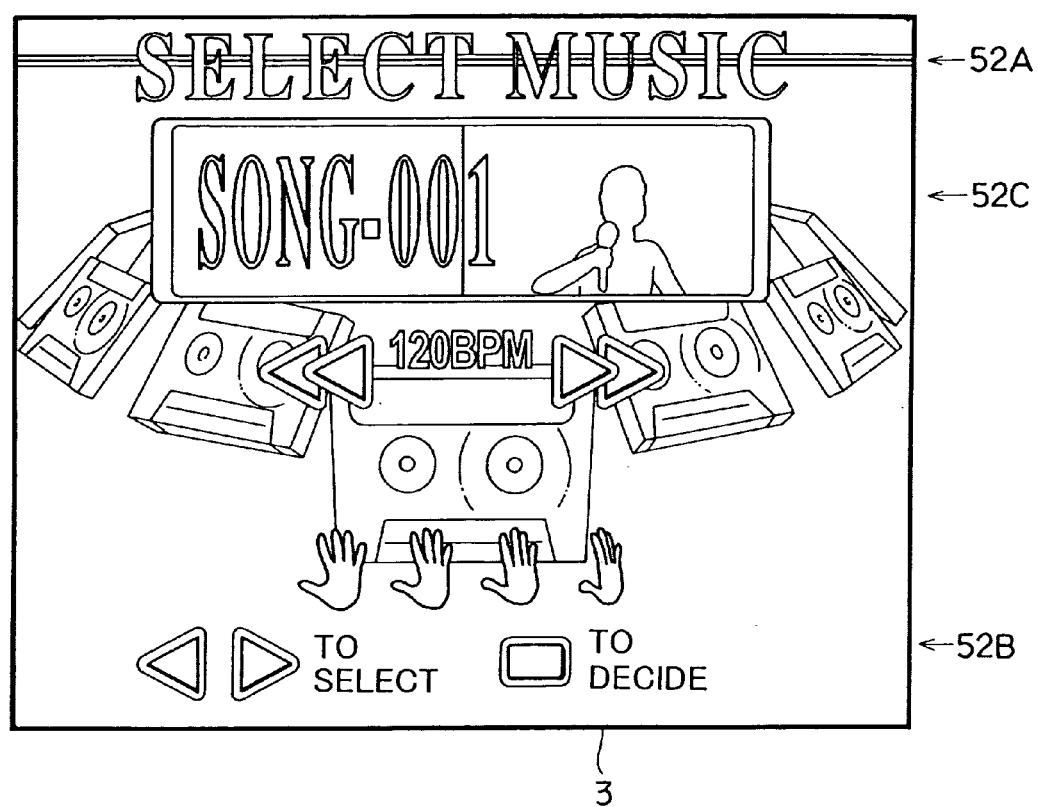
FIG. 11 is a diagram showing a content of an image (display content representing a content of a selection mode for music numbers during a game) displayed on the monitor.

FIG. 11 shows a display contents representing contents of a selection mode of a musical number (background sound) played during the game. Identified by 52A, 52B, 52C are displays representing the musical number selection mode, explanation of the selecting operation, and the selected musical number (background sound).

Figure 12:
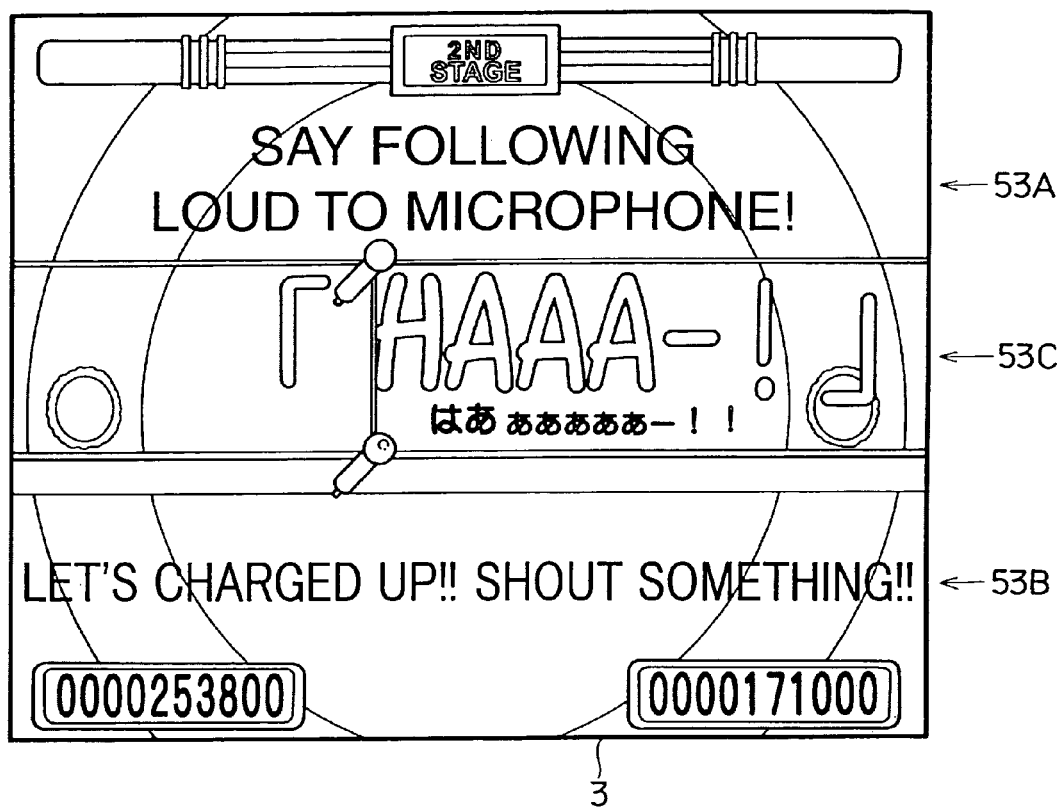
FIG. 12 is a diagram showing a content of an image (display content representing a content of instruction to shout at a microphone at the start of an introduction of a music number) displayed on the monitor.

FIG. 12 shows a display content representing contents of instructions to shout at the microphone 4 after the start of an introduction. Identified by 53A, 53B and 53C are displays representing contents of instructions and a display representing a shouting voice, e.g. "HAAA-!". At the time of this display, a disk jockey instructs a content of shouting and a shouting timing by voice. The shouting timing is instructed by temporarily changing the color of 5 letters, i.e. "HAAA-" of the display 53C of the display screen one by one at a specified speed from the left. The game player may shot following the color change. Instead of changing the color, a mark such as an arrow may be moved. The moving or changing speed may not be constant, and may be partly changed. In this embodiment, two kinds of voices are inputted to the microphone 4. However, in the case that the game player does not input his voice, sounds based on the sound data stored in the CD-ROM 41 are generated.

Figure 13A:
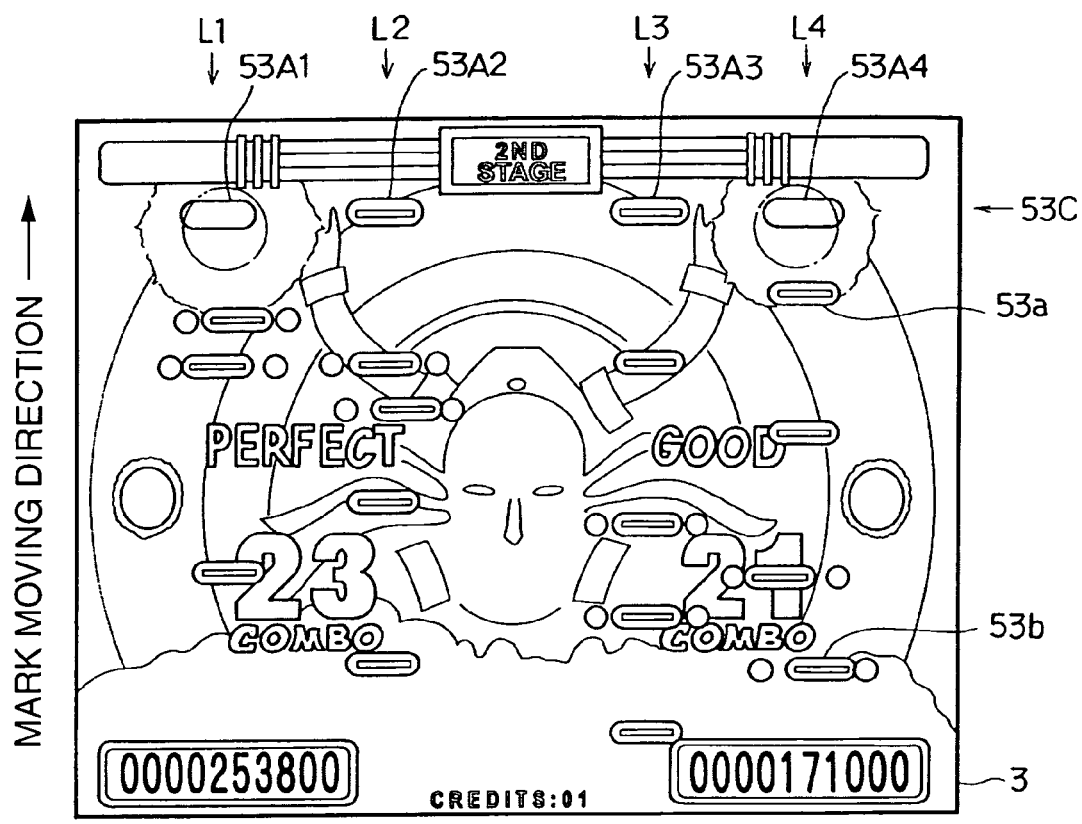
FIG. 13A is a diagram showing a content of an image (display content after the start of the game) displayed on the monitor.
Figure 13B:
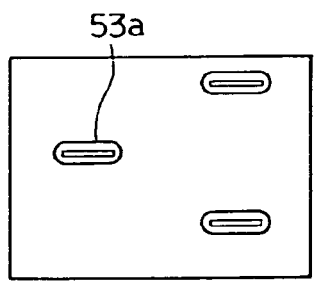
FIG. 13B is a diagram showing instruction marks for a hitting motion.
Figure 13C:
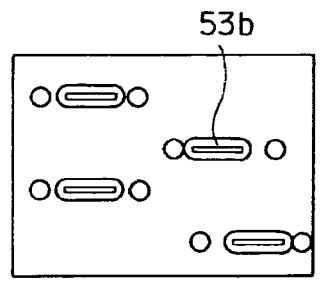
FIG. 13C is a diagram showing instruction marks for a swinging motion.

FIG. 13A shows a display content after the start of the game, FIG. 13B is a display showing instruction marks 53a for the hitting motion, and FIG. 13C is a display showing instruction marks 53b for the swinging motion.

L1, L2, L3, L4 in FIG. 13A are virtual lines on which the instruction marks (timing notes) 53a, 53b move. The instruction marks 53a for the hitting motion are so displayed as to move up straight on the respective virtual lines (scroll-display). On the other hand, the instruction marks 53b for the swinging motion are so displayed as to move up straight on the respective virtual lines (scroll-display) and to transversely swing. L1, L2, L3, L4 are the virtual line for the left hand of the left player, the virtual line for the right hand of the left player, the virtual line for the left hand of the right player, and the virtual line for the right hand of the right player, respectively. In the case of the single-player game, the virtual lines L1, L2 are used because the left switch operation unit 14 is used.

The signal generating device 5 is hit or swung during a specified period within which the instruction marks 53a, 53b coincide with reference marks 53A1, 53A2, 53A3, 53A4 provided in reference positions 53C on the respective virtual lines L1, L2, L3, L4. While this display is made, the musical number (background sound) comes out through the loudspeakers 7 and 11. If the signal generating device 5 makes a corresponding motion during the specified period within which the instruction marks 53a, 53b coincide with the reference marks 53A1, 53A2, 53A3, 53A4, either one kind of sound set in advance corresponding to each one of the instruction marks 52a, 53b or the inputted voice comes out through the loudspeakers 7 and 11. The sounds are not necessarily defined in correspondence with the instruction marks 53a, 53b.

Figure 14:
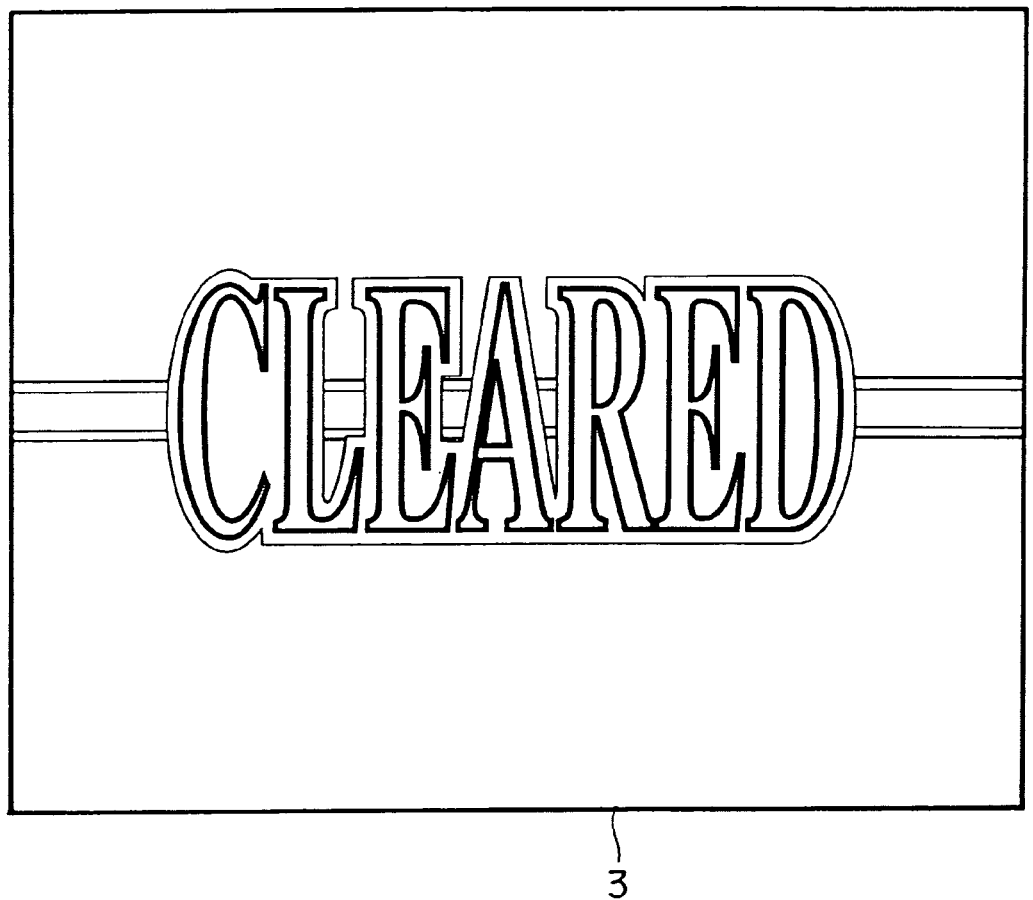
FIG. 14 is a diagram showing a content of an image (display content representing completion of the music number) displayed on the monitor.

FIG. 14 shows a display contents representing the completion of the musical number (background sound).

Figure 15:
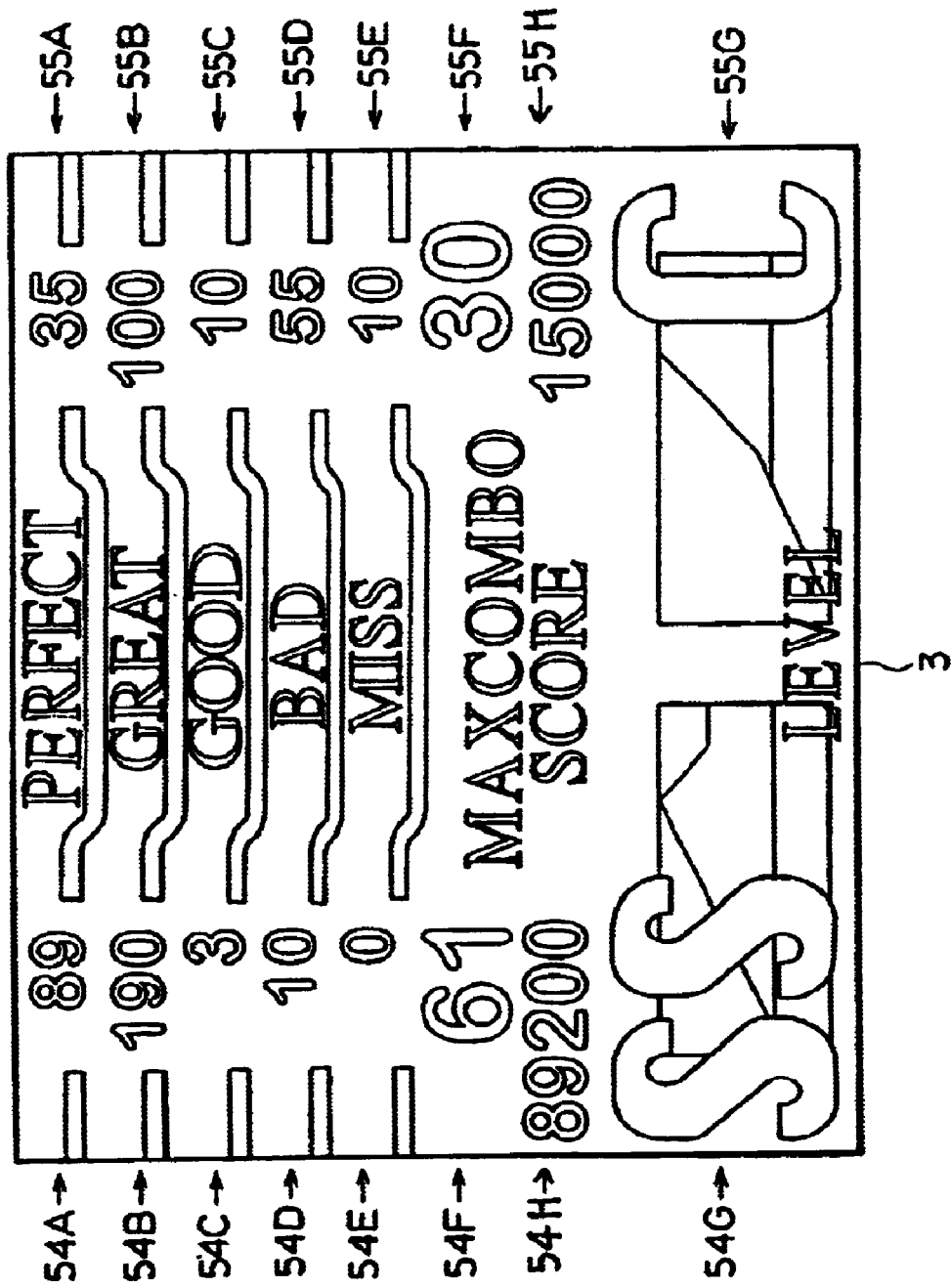
FIG. 15 is a diagram showing a content of an image (display content representing a game result) displayed on the monitor.

FIG. 15 shows a display contents representing scores. The score at the left side of FIG. 15 is of the left player. The number of times of perfect coincidence is displayed in a display area 54A; the number of times of great coincidence in a display area 54B; the number of times of good coincidence in a display area 54C; the number of times of bad coincidence in a display area 54D; the number of times of missed coincidence in a display area 54E; the number of maxcombo in a display area 54F; the score in a display area 54H; and a level of the game result. in a display area 54G. Classifications of perfect, great, good, bad and miss coincidences, the maxcombo, the score and the level of the game result are described later herein.

On the other hand, the score at the right side of FIG. 15 is that of the right player. The number of times of perfect coincidence is displayed in a display area 55A; the number of times of great coincidence in a display area 55B; the number of times of good coincidence in a display area 55C; the number of times of bad coincidence in a display area 55D; the number of times of miss coincidence in a display area 55E; the number of maxcombo in a display area 55F; the score in a display area 55H; and a level of the game result in a display area 55G.

Figure 16:
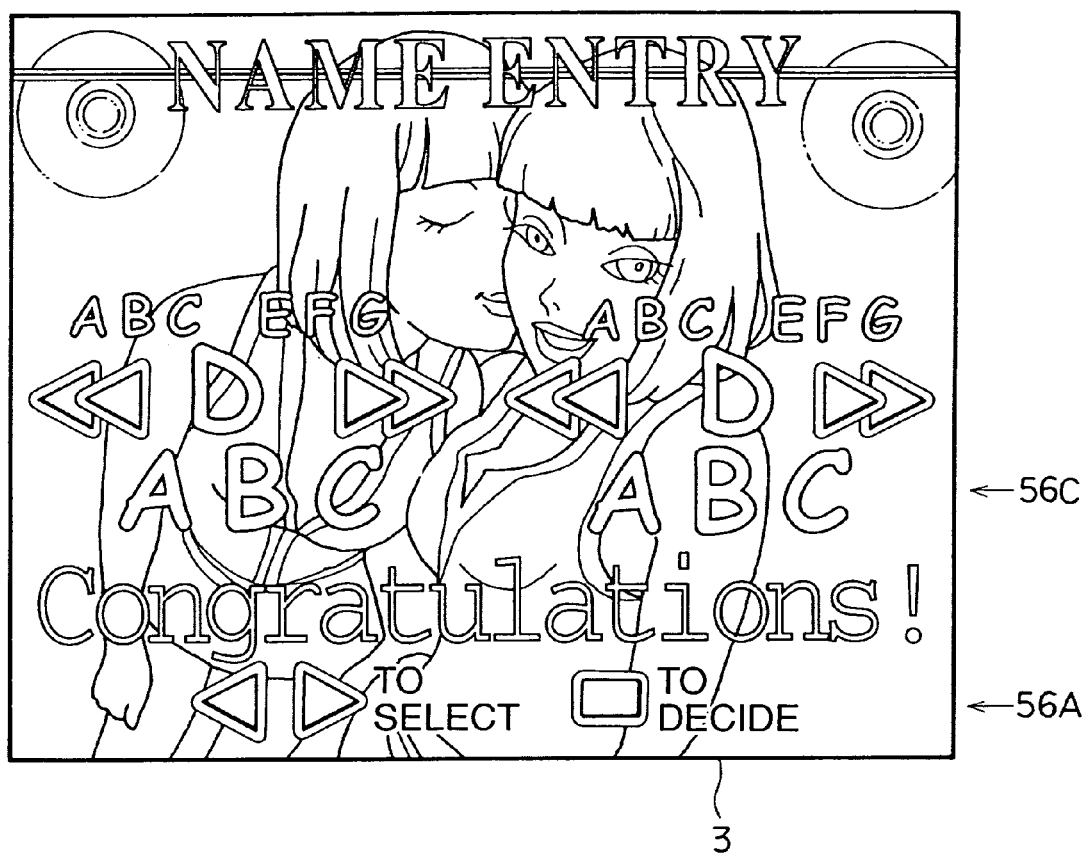
FIG. 16 is a diagram showing a content of an image (display content representing entry of a name) displayed on the monitor.

FIG. 16 shows a display contents in the case that the name of the game player is entered in the ranking, wherein 56A denotes a display representing an operation procedure and 56C denotes a display representing the entered name.

Figure 17:
FIG. 17 is a diagram showing a content of an image (display content representing a ranking) displayed on the monitor.

FIG. 17 shows a display contents representing an example of the ranking in which the top 10 of the game players who played the game and their scores are listed from the best player.

Figure 18:
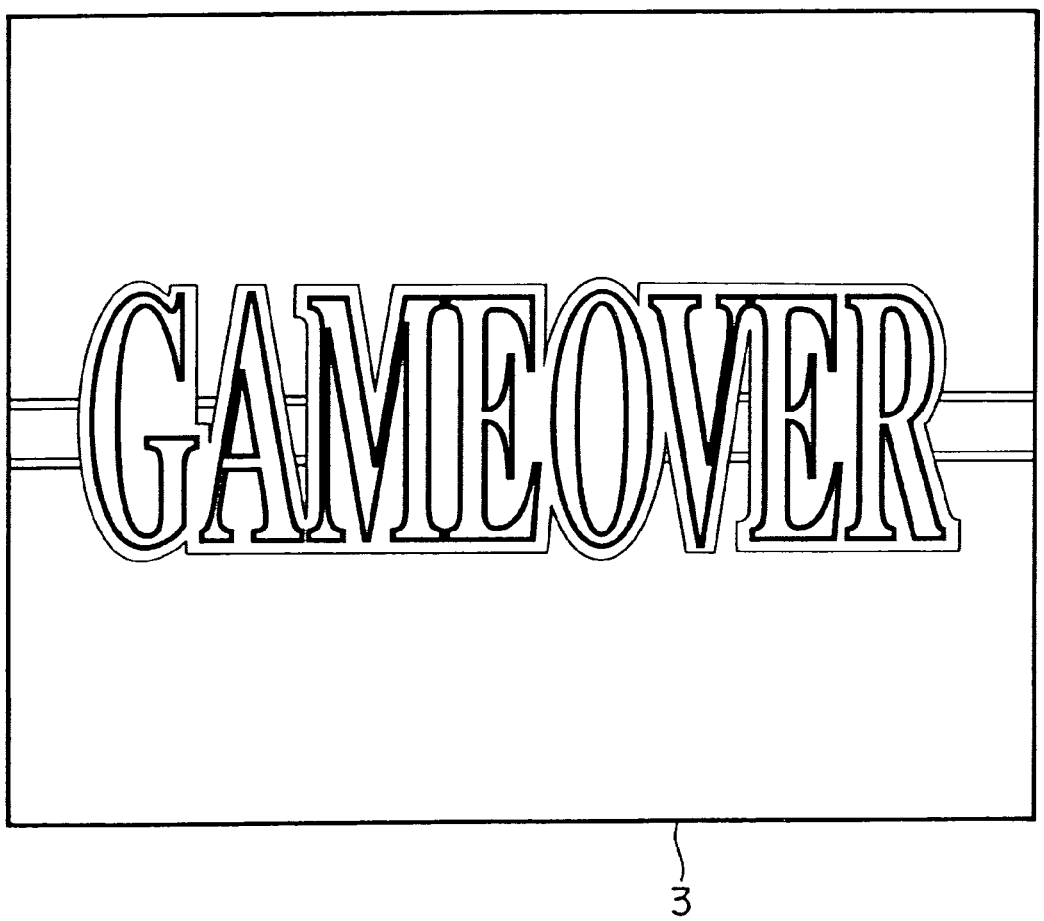
FIG. 18 is a diagram showing a content of an image (display content representing an end of a series of game contents) displayed on the monitor.
Figure 19:
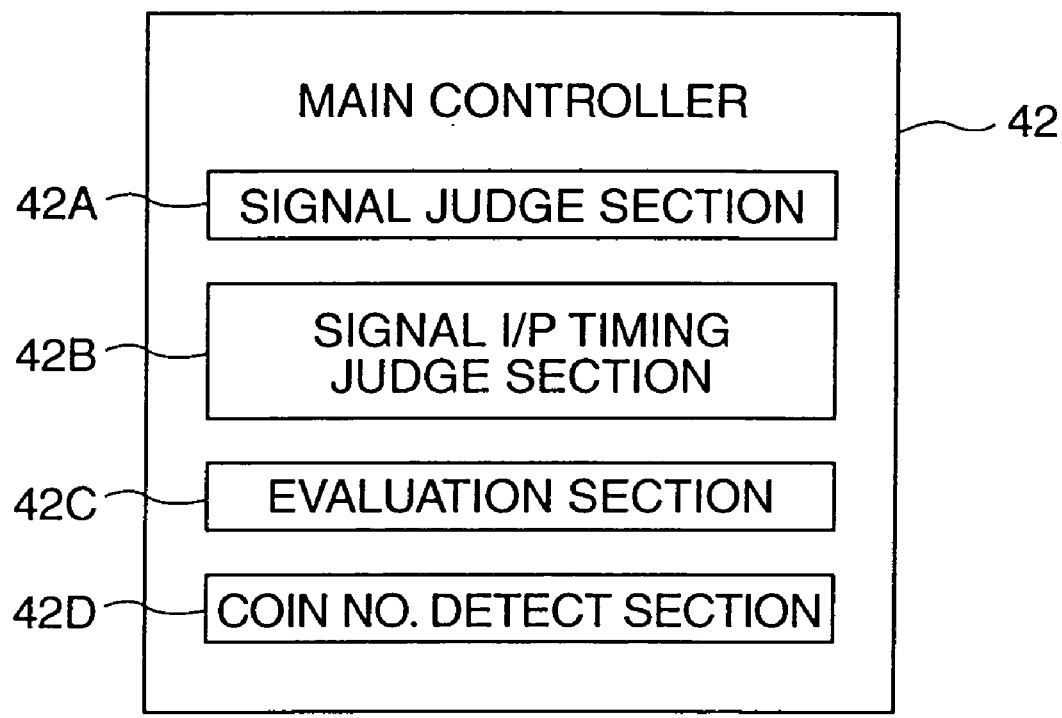
FIG. 19 is a construction diagram showing the construction of a main controller provided in the game system.

FIG. 18 shows a display contents after the completion of a series of game contents. The game ends when this display is shown.

Data used to make the above displays are stored together with background images in the image data storage 46, and the image controller 45 reads the image data from the image data storage 46 in the above sequence and contents of the control and, cause the monitor 3 to display them.

An operating content as a program necessary to control the entire operation of the game system 1 is written in the main storage 43, and the data stored in the CD-ROM 41 are also stored therein. The main storage 43 may be comprised of, e.g. a ROM and a RAM or of only a ROM.

Detection signals from the impact sensor 30 and the acceleration sensor 31, sound data obtained by converting voices into electrical signals by the microphones 4 and further converting the electrical signals into digital signals by an unillustrated analog-to-digital converter, and a detection signal from an unillustrated coin detector provided in the coin inserting device 9 are inputted to the main controller 42 via an interface (I/O) 42a. The sound data inputted via the microphones 4 are sent to the sound data storage 48.

The main controller 42 is, as shown in FIG. 9, provided with a signal judging section 42A, a signal input timing judging section 42B, an evaluation section 42C and a coin number detecting section 42D.

The signal judging section 42A judges whether the respective detection signals from the impact sensor 30 and the acceleration sensor 31 are specified signals. In this embodiment, the signal judging section 42A judges that a swinging motion has been made when only the detection signal from the acceleration sensor 31 is received, and a hitting motion has been made when the detection signal from the impact sensor 30 is received. This judgment is made because the signal is not outputted from the impact sensor 30 at the time of the swinging motion and both the impact sensor 30 and the acceleration sensor 31 may output detection signals at the time of the hitting motion. By making this judgment, an error in detection can be prevented.

The signal input timing judging section 42B judges at which timings the respective detection signals from the impact sensor 30 and the acceleration sensor 31 were inputted. Four periods of, e.g. perfect, great, good and bad are set. These periods have such a specific construction that the good period shorter than the bad period is set inside the longest bad period, the great period shorter than the good period is set inside the good period, and the perfect period shorter than the great period is set inside the great period. The centers of the perfect, great, good and bad periods coincide with each other. The signal input timing judging section 42B in which period the signal input timing falls and judges that the corresponding motion is perfect if the signal was inputted within the perfect period, great if the signal was inputted within the great period, good if the signal was inputted within the good period, and bad if the signal was inputted within the bad period.

The evaluation section 42C evaluates a game result based on a signal received from the signal input timing judging section 42B. Specifically, the evaluation section 42C calculates the numbers of the perfect, great, good and bad motions and judges a missed motion if a motion different from the instruction mark was made, no motion was made despite the fact that the instruction mark was displayed or the signal input timing corresponding to the motion made lies outside the bad period. Further, if the perfect motions continue, the largest of the numbers of continuous perfect motions is obtained as the maxcombo. In this example, SSS, SS, S, A, B, C, D, F are set as levels representing the game results. These numbers and letters are displayed on the monitor 3 (see FIG. 15). Here, the score and the level are determined based on a ratio of the number of the signals judged to be perfect, great or good by the signal input timing judging section 42B to a total number of the marks 53a, 53b set in the evaluation section 42C. The marks 53a, 53b may be those stored in the CD-ROM 41 beforehand. Alternatively, the evaluation section 42C or the like may successively add the number of the marks 53a, 53b in accordance with the program.

The coin number detecting section 42D judges that a single-player game is possible in the case that one detection signal is detected by the coin detector (not shown) while judging that a dual-player game is possible in the case that two detection signals is detected by the coin detector. Whether the single-player game or the dual-player game is to be played is actually decided by operating the operation button 14c as described above.

The sound data storage 48 is so constructed as to store, for example, about 60 kinds of sound data in the respective storage areas. The sound data stored in the storage areas include the sound data stored in the CD-ROM 41 and signals (sound data) obtained by converting voices given by a game player into electrical signals by the microphones 4 and further converting the electrical signals into digital signals by the unillustrated analog-to-digital converter. Such sound data are set in one-to-one correspondence with the instruction marks 53a, 53b.

Figures 20, 21:
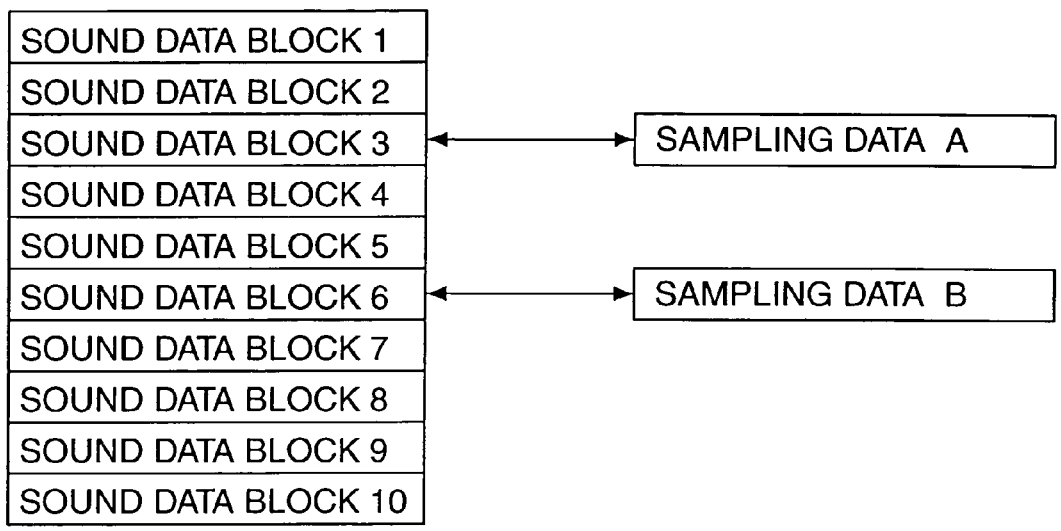
FIG. 20 is a diagram showing storage area in a sound data storage provided in the game system, and how sound data are stored.
FIG. 21 is a table showing contents of sound modulations performed by a sound controller provided in the game system.

FIG. 20 is a diagram showing part of the storage areas of the sound data storage 48. In this shown example, the sound data stored in the CD-ROM 41 are stored in the storage areas other than sound data blocks 3 and 5, and the sound data relating to the voices sampled by the microphones 4 are stored in the sound data blocks 3 and 5. In the case that no voice is inputted, the sound data set beforehand are stored. Here, the sound data blocks 3 and 5 are referred to as sound block data A and B, respectively.

In the sound data storage 48 are also stored number data relating to address numbers of the storage areas of the sound data storage 48 storing the respective sound data described above. If the signal judging section 42A judges the detection signal inputted from the impact sensor 30 or the acceleration sensor 31 to the main controller 42 is a specified signal, the main controller sends a signal to the sound controller 47, which in turn reads the sound data of the corresponding address number from the sound data storage 48 and outputs it to a sound mixing device 49. This output is made based on a timing at which the sensor 30 or 31 generated the signal. However, in the case of the missed or bad motion, the sound output may not be performed.

In other words, the sound data may be read from the sound data storage 48 and outputted if the signal has been inputted to the signal input timing judging section 42B during the good, great or perfect period.

The sound controller 47 has a function of processing the sound data, e.g. a sound modulating function, and modulates the sound data read from the sound data storage 48 according to the preprogrammed type of modulation for the corresponding one of the instruction marks 53a, 53b and outputs the modulated sound data to the sound mixing device 49. The types of modulation include the type of changing the sound level of voices lying within at least part of frequency regions divided at specified intervals (hereinafter, modulation 1); the type of thinning out voices lying within part of the frequency regions (hereinafter, modulation 2); and the type of expanding and compressing at least part of sound waves with respect to a time axis (hereinafter, modulation 3).

The types of modulation by the sound modulating function of the sound controller 47 can be changed according to the operational position of the slide switch (referred also to as a slider) 14d. For instance, the types of sound modulation at the upper part of FIG. 10 are selected if the slide switch 14d is set at left-side positions, whereas those at the lower part of FIG. 10 are selected if the slide switch 14d is set at right-side positions.

FIG. 21 is a table showing an example of sound modulations applied to the voices sampled by the microphones 4.

In this shown example, the sound data blocks 1, 4 are not modulated because they are the sound data stored in the CD-ROM 41, whereas the sound data blocks A and B storing the sound data relating to the voices sampled by the microphones 4 are subjected to the modulations 1 and 3 for the corresponding ones of the instruction marks 53a, 53b. The modulation which can be changed according to a degree of slidable displacement of the slide switch 14d can be applied to all the sound data read from the sound data storage 48. Although the modulations 1 and 3 are performed in the example of FIG. 21, desired one(s) of the modulations 1 to 5 can be applied.

The sound mixing device 49 has a digital-to-analog converting function and is adapted to covert the sound data from the sound controller 47 into an analog signal and output it as a real sound through the loudspeakers 7 and 11. The sound data of the background sound stored in the CD-ROM 41 is directly inputted to the sound mixing device 49, which in turn converts the received sound data into an analog signal and outputs as a real sound through the loudspeakers 7 and 11.

The CD-ROM 41 is detachably mounted in the game system 1. The data and program stored in the CD-ROM 41 are read by an unillustrated data reading means, and image-relating ones of the read data and program are stored in the image data storage 46, sound-relating ones thereof are stored in the sound data storage 47, and the remainder is stored in the main storage 43.

The image data stored in the CD-ROM 41 include, for example, the displays 50A to 56C displayed on the monitor 3 as shown in FIGS. 9 to 18, and the image control programs stored in the CD-ROM 41 include, for example, the image data reading timings. The sound data stored in the CD-ROM 41 include, for example, the sound data to be stored in the sound data storage 48 (excluding the voices inputted through the microphones 4) and the background sounds, and the sound control programs stored in the CD-ROM 41 include, for example, the sound data reading timings.

The remaining data and programs stored in the CD-ROM 41 include, for example, a lamp turning program. The lamp turning program is inputted to the main controller 42 via the interface 42a, the main controller 42 sends a command signal based on this program to the lamp driving device 44, and the lamp driving device 44 controllably turns on the corresponding one(s) of a plurality of lamps 8 in accordance with the received command signal from the main controller 42. Since the CD-ROM 41 is detachably mounted as described above, another storage medium storing other musical numbers (background sounds) and different positions of the instruction marks can be set in the game system 1.

Figure 22:
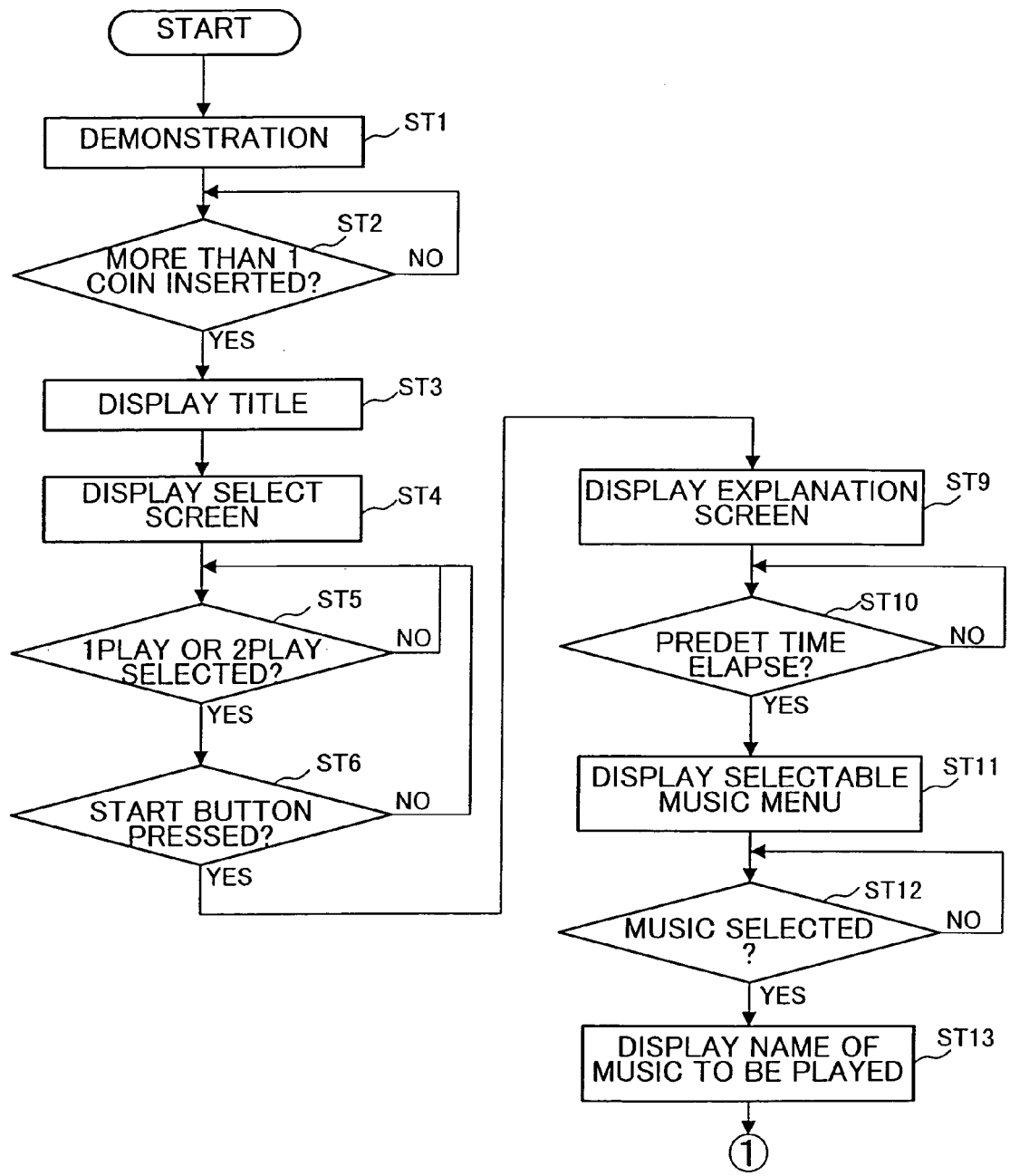
FIG. 22 is a first portion of a flow chart showing contents of controls executed in the game system.
Figure 23:
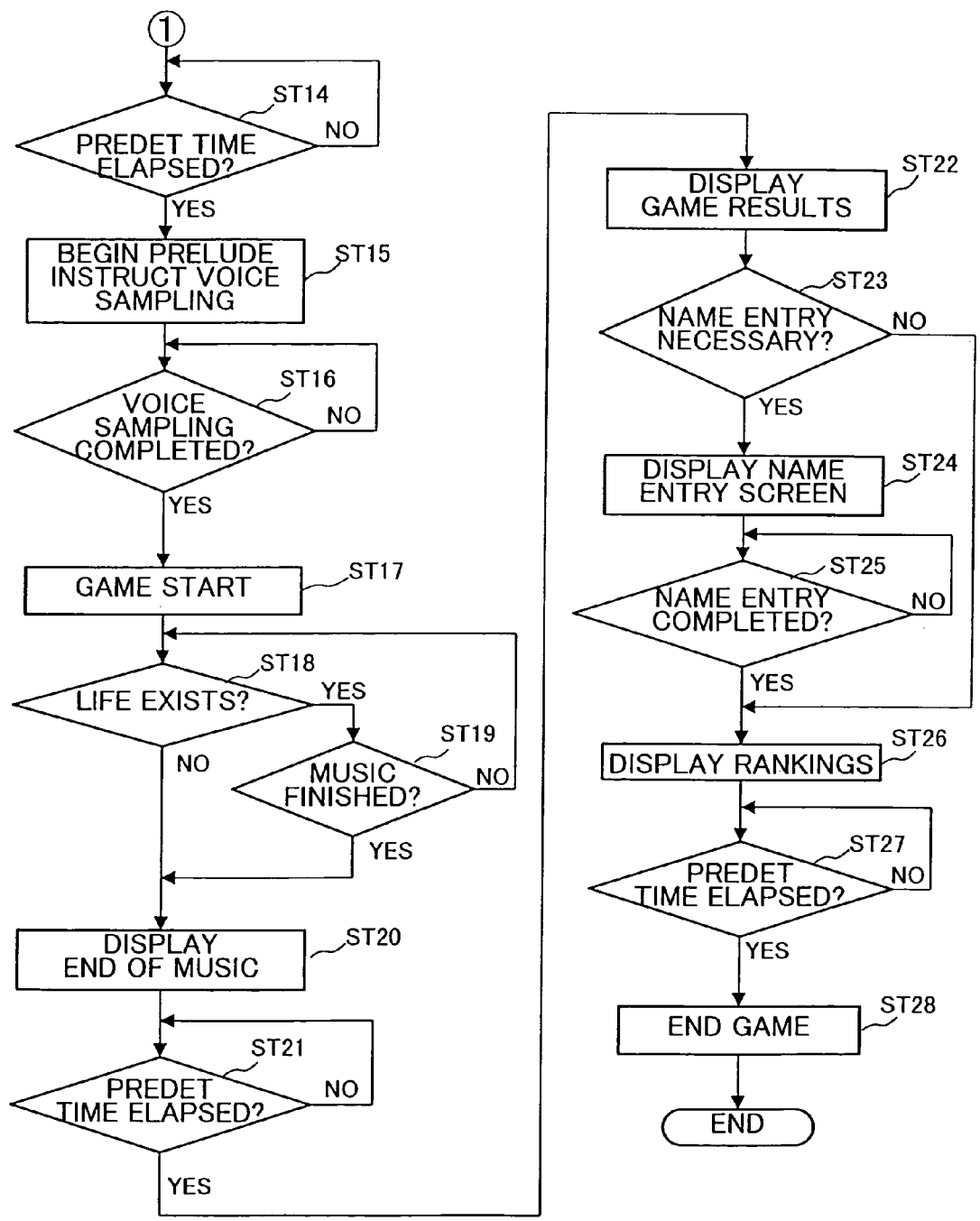
FIG. 23 is a second portion of the flow chart of FIG. 22.

FIGS. 22 and 23 are two portions of a flow chart executed in the game system according to this embodiment.

First, prior to the start of the game, in Step ST1, displays and sound output (demonstration) are made to introduce the contents of the game, operation procedure, ranking up to the present, etc., and the image shown in FIG. 9 is, for example, displayed on the monitor 3, and how to play the game is explained through the loudspeakers 7 and 11. Simultaneously, it is discriminated whether one or more coins have been inserted (Step ST2).

If one or more coins have been inserted, a game title, e.g. "Rap Freaks" is displayed on the monitor 3 for a predetermined time (Step ST3), and a specified selection screen is then displayed on the monitor 3 (Step ST4).

A game player selects a single-player game or a dual-player game. It is then successively discriminated whether the selection has been completed (Step ST5) and whether a start button has been pushed (Step ST6). When the start button is discriminated to have been pushed, a specified explanation screen is displayed (Step ST9).

Subsequently, it is discriminated whether a predetermined time has elapsed (Step ST10). If the discrimination result is affirmative, a multitude of selectable musical numbers (background sounds) are displayed on the monitor 3 (Step ST11). During this display, the game player selects one or two desired musical numbers from the displayed musical numbers.

It is then discriminated whether the selection of the musical number has been completed (Step ST12), and the name of the selected musical number is displayed on the monitor 3 as shown in FIG. 11 (Step ST13) if the selection has been completed.

Subsequently, it is discriminated whether another predetermined time has elapsed (Step ST14). If the discrimination result is affirmative, an introduction is started and a voice sampling instruction is given by displaying the screen for the voice sampling shown in FIG. 12 and outputting the voice through the loudspeakers (Step ST15). In accordance with this instruction, the game player speaks or shouts a sentence of the instructed content at the microphone 4, and his voice is stored in the specified storage area of the sound data storage 48.

It is then discriminated whether the voice sampling has been completed (Step ST16), and the game is started (Step ST17) if the voice sampling has been completed. As the game is started, the game content shown in FIG. 13A is displayed on the monitor 3, and the game player moves the signal generating device 5 in response to the instruction marks 53a for the hitting motion and the instruction marks 53b for the swinging motion. During the game, a life is administered by the accumulation of evaluations made by the main controller 42. This life administration is such that a life gauge increases upon a good evaluation (perfect, great)

and decreases upon a bad evaluation (bad, missed). If the life gauge runs short, the game is over.

Subsequently, it is discriminated whether the life still exists and whether the musical number has ended (Steps ST18, ST19).

If the life is discriminated to have ended (NO in Step ST18) or if the music number is discriminated to have ended (YES in Step ST19), a display is made to inform the end of the musical number (Step ST20). Specifically, a message "CLEARED" as shown in FIG. 14 is displayed on the monitor 3 if the music number is played to the end, whereas a message "FAILURE" is displayed if the music number is ended upon exhaustion of the life.

Subsequently, it is discriminated whether a predetermined time has elapsed (Step ST21). If the discrimination result is affirmative, a game result as shown in FIG. 15 is displayed on the monitor 3 (Step ST22). This game result is a result of evaluation of the evaluating section 42C as to whether the game player made the hitting motions and the swinging motions in response to the instruction marks 53a, 53b within a predetermined period while holding the signal generating device 5.

It is then discriminated whether the entry of the name is necessary (Step ST23). This discrimination is made by the evaluating section 42C by discriminating whether the score of the game player is equal to or above a reference value upon the end of the music number, i.e. whether this score satisfies a name entry condition. If the entry of the name is necessary, a name entry screen shown in FIG. 16 is displayed on the monitor 3 (Step ST24), and the game player performs a name entry operation accordingly.

Subsequently, it is discriminated whether the entry of the name has been completed (Step ST25), and a ranking as shown in FIG. 17 is displayed (Step ST26) if the discrimination result is affirmative. If the entry of the name is not necessary (NO in Step ST23), this routine directly proceeds to Step ST26 to display the ranking.

Subsequently, it is discriminated whether a predetermined time has elapsed (Step ST27). If the discrimination result is affirmative, the game is ended and a message "GAME OVER" shown in FIG. 18 is displayed on the monitor 3 (Step ST28).

Accordingly, in the case of this embodiment, the instruction marks for the hitting and swinging motions are displayed on the display screen, and the game player is required to operate the signal generating devices by the motions corresponding to the instruction marks. At this time, the game player needs to instantaneously judge which of the two kinds of instruction marks the displayed instruction mark is. Since both motions are made by operating the same signal generating devices, the game player tends to make wrong motions. As a result, the game becomes more interesting and enjoyable.

Further, since the game player makes the hitting and swinging motions by operating the signal generating devices, he can play the game while freely moving around the game system. In addition, the game result reflects whether or not the timings at which the game player makes a specified motion coincides with a predetermined timing. Thus, the game can further be made more interesting and enjoyable.

Furthermore, since the game player moves the signal generating devices by both hands, the game can be made even more interesting and enjoyable.

The present invention is not limited to the foregoing embodiment, and may be embodied as follows.

(1) The instruction marks are scroll-displayed by being moved with respect to the reference marks in specified positions in the foregoing embodiment. However, according to the present invention, the reference marks may be scroll-displayed while the instruction marks are arranged in specified positions. In such a case, marks having substantially the same shape as the instruction marks of the foregoing embodiment or arrows may be used as reference marks.

(2) Although the signal generating device has the hitting surface A in the foregoing embodiment, it may be a bar having no hitting surface such as a bat or may be something like a glove in which the game player's hand is insertable. The signal generating device may be fitted on the game player's wrist instead of being held in hand.

(3) Although the impact sensor is used for detecting the hitting motion in the foregoing embodiment, another sensor may be used therefor according to the present invention.

(4) Although the acceleration sensor is used for detecting the swinging motion in the foregoing embodiment, another sensor may be used therefor according to the present invention.

(5) Although the signal generating devices are operated to make the hitting and swinging motions in the foregoing embodiment, they may be operated to make the hitting or swinging motion according to the present invention. In such a case, only the instruction marks of the corresponding motion may be displayed on the display screen. Further, only the sensor for detecting the corresponding motion may be used.

(6) Although two game players operate the signal generating devices while holding them in both hands in the foregoing embodiment, they may operate one each of the signal generating devices while holding it in one hand according to the present invention. In such a case, the instruction marks may be displayed using two of the virtual lines L1 to L4. In addition, the game system of the present invention may be constructed such that one game player plays the game.

(7) Although the main controller, the image controller and the sound controller are separately formed in the foregoing embodiment, they may be formed into a unit or divided into two units according to the present invention.

(8) Although the background sounds and the sounds based on the signal (or instruction mark) generated by the signal generating means (sensors 30 and 31) are outputted from the loudspeakers in the foregoing embodiment, only the background sounds may be outputted, and the sounds based on the signals (or instruction mark) generated by the signal generating means (sensors 30 and 31) may not be outputted from the loudspeakers according to the present invention.

As described in detail above, according to the inventive game system, the game player operates the signal generating device by at least one of the hitting motion and the swinging motion based on the instruction of motion displayed on the display screen. Accordingly, the game player is required to time his motion with the display of the instruction and can play the game while freely moving around the game system. In addition, since the instructions of motion are successively renewed, the game player is required to prepare for a next motion timing. In addition, the game result reflects whether or not the timing of motion made by the game player coincides with the display of the instruction. Therefore, the game played in this game system can be made highly interesting and enjoyable.

Summing up the aforementioned descriptions, a game system comprises a signal generating device, adapted for being held by a game player and for being usable in applying a hitting motion or a swinging motion, the signal generating device including a signal generating unit for generating a signal in response to the hitting motion or the swinging motion; a display means having a display screen for displaying and successively renewing as instruction of motion on the display screen, an evaluating means for evaluating a game result based on a generation timing of the signal, and a sound generating means for outputting at least a background sound.

With the aforementioned game system, since the game player operates the signal generating device by at least one of the hitting and swinging motions in response to the instruction of motion displayed on the display screen, he is required to time his motion with the display of the instruction and can play the game while freely moving near and around the game system. Further, since the instructions of motion are successively renewed, he is required to prepare for a next motion timing. In addition, the game result reflects whether or not the timing of motion made by him coincides with the display of the instruction. Therefore, the game played in this game system can be made highly interesting and enjoyable.

In this construction, at least the background sounds need to be outputted. However, the sounds based on the signals generated by the signal generating means (hereinafter also referred to as a signal generator) in response to the operation of the signal generating device may not necessarily be outputted.

In addition to the background sounds, the sound generating means may output sounds based on at least a part of the signals generated by the signal generating means (signal generator).

With this construction, the sound generating means outputs the sounds based on at least a part of the signals generated by the signal generating means in addition to the background sounds. Here, the background sounds include all sounds except the sounds based on the signals generated by the signal generating means: include, e.g., complete musical numbers, parts of musical numbers, and arrangements of the musical numbers. On the other hand, the sounds based on the signals generated by the signal generating means include effect sounds to be added to the musical numbers, and sounds constituting part of the musical numbers. Such sounds may correspond not only to all the signals generated by the signal generating means, but also to part of them.

In addition, the sound generating means outputs the sounds based on the generation timing of the signal.

With such a sound generating means, the sound can be outputted at a timing corresponding to the operation of the signal generating device.

In the aforementioned game system, the instruction of motion displayed on the display screen may be in the form of an instruction mark.

Furthermore, the display means may include an image data storage means for storing a display timing data of each instruction mark, and an image control means for reading a corresponding instruction mark to be displayed from the image data storage means and scroll-displaying the read instruction mark on the display screen with respect to a reference mark.

With the above construction, either one of the instruction mark and the reference mark is arranged in a specified position, and the other thereof is displayed while being moved toward the one thereof. Accordingly, the game player can operate the signal generating device in consideration of a next motion timing.

In the above game system, the sound generating means may include a sound data storage means for storing a multitude of kinds of sound data, a sound control means for reading a corresponding sound data from the sound data storage means based on the signal inputted thereto from the signal generator, and a sound output means for outputting a sound based on the sound data read by the sound control means.

In this case, the sound control means reads the corresponding sound data from the sound data storage means when the signal is inputted from the signal generator during the predetermined period. Thus, when no signal is inputted from the signal generator during the predetermined period, no sound data is read, with the result that the background sounds become discontinuous, causing the rhythm of the music number to be out of tune. Since the game player tries hard to avoid such an event, the game can be made more interesting and enjoyable.

The aforementioned game system may further comprise a replaceable storage member for readably storing a display timing data of each instruction mark stored in the image data storage means, a control program of the image control means, a multitude of kinds of sound data to be stored in the sound data storage means and a control program of the sound control means, wherein the data and the programs stored in the storage member are to be stored in the image data storage means and the sound data storage means.

With this construction, since the storage member is replaceable, the background sounds and the positions of the instruction marks can be changed if a storage member having different data is separately prepared, thereby varying the content of the game. In such a case, the storage member may store the background sounds, and the background sounds stored in the storage member are preferably outputted from the sound output means.

The evaluating means may evaluate a game result based on a ratio of the number of the signals inputted during the predetermined time period from the signal generator to a total number of the instruction marks.

With this construction, the rhythmic feeling of the game player can be correctly evaluated.

In the aforementioned game system, the signal generator may be operated by both of the hitting motion and the swinging motion, the display means may display a first instruction mark for the hitting motion and a second instruction mark for the swinging motion on the display screen as the instruction mark, and the signal generator may generate a first signal corresponding to the hitting motion and a second signal corresponding to the swinging motion as the signal.

With this construction, if the display means displays the first instruction mark for the hitting motion and the second instruction mark for the swinging motion on the display screen, the game player is required to operate the signal generating device by a motion corresponding to the displayed instruction mark. At this time, the game player needs to instantaneously judge which of the two kinds of instruction marks the displayed instruction mark is. Since both motions are made by operating the same signal generating device, the game player tends to make wrong motions. As a result, the game becomes more interesting and enjoyable.

In the aforementioned game system, the sound control means may read the corresponding sound data from the sound data storage means based on a combination of ON-OFF states of the first and second signals from the signal generator.

With this construction, it is possible, for example, to judge that the swinging motion was made when only the first signal was ON while judging that the hitting motion was made when the second signal was ON. In other words, depending on the operation of the signal generating device, there is a likelihood that the signal generator may output both the first and second signals of ON-state. However, by taking this construction, one of the hitting and swinging motions can be securely specified, thereby detecting and preventing an error.

In the aforementioned game system, two image display areas for displaying the first and second instruction marks while moving them with respect to the reference mark can be provided on the right and left sides of the display screen with respect to the game player, and two signal generator may be provided on the right and left sides of the game system with respect to the game player.

With this construction, since the game player is required to operate with both hands, the game can be further made more interesting and enjoyable.

Moreover, in the aforementioned game system, two image display areas can be provided for a plurality of game players, and a two signal generator or generators can also be provided for a plurality of game players.

With this construction, since a plurality of game players can simultaneously play the game, the game can be made more enjoyable.

This application is based on a Japanese Patent Application Serial No. 11-253685 filed on Sep. 7, 1999, the priority of which is claimed under Paris convention, and thus the contents thereof is incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A game system comprising:
  a signal generating device having a first curved surface, a second surface opposing said first surface, and a retaining device retaining said first curved surface in a palm of a game player in a glove fitting manner permitting transfer of at least one of a hitting motion and a swinging motion imparted thereto by said game player, the signal generating device including a signal generator, the signal generator including:
    a first sensor for sensing an impact of the signal generating device requiring an impact contact of the second surface of the signal generating device with an external object;
    a second sensor for sensing an acceleration of the signal generating device;
    said first sensor generating a first signal in response to said hitting motion of the game player effecting said impact contact of the second surface of the signal generating device with the external object when said impact is sensed while said signal generating device is retained by the game player;
    said second sensor generating a second signal in response to said swinging motion when said acceleration is sensed while said signal generating device is retained by the game player;
    said second signal being indicative of a change in velocity of said signal generating device being moved by said game player, an entirety of said second sensor of said signal generator being movable by the game player from a first location to a second location by movement of said signal generating device retained by the game player, said change in velocity being measured as a difference between a first velocity of said second sensor when at said first location and a second velocity of said second sensor when at said second location; and
    said first signal being indicative of a change in a state of said signal generating device being moved by said game player from a third location to a fourth location by movement of said signal generating device retained by the game player, said change in the state being measured as a difference, other than the change in velocity of the first sensor when at said third location and said state when at said fourth location, generated by said impact contact of the second surface of the signal generating device with the external object;
  a display having a display screen for displaying and successively renewing an instruction of motion on the display screen;
  evaluating means for evaluating a game result based on a generation timing of the signal; and
  a sound generator for outputting at least a background sound.

2. A game system according to claim 1, wherein the sound generator outputs sounds based on at least a part of the signals generated by the signal generator.

3. A game system according to claim 2, wherein the sound generator outputs the sounds based on the generation timing of the signal.

4. A game system according to claim 1, wherein the instruction of motion displayed on the display screen is in a form of at least one instruction mark.

5. A game system according to claim 4, wherein the display includes an image data storage means for storing a display timing data of each instruction mark, and an image control means for reading a corresponding instruction mark to be displayed from the image data storage means and scroll displaying the read instruction mark on the display screen with respect to a reference mark.

6. A game system according to claim 1, wherein the sound generator includes a sound data storage means for storing a multitude of kinds of sound data, a sound control means for reading a corresponding sound data from the sound data storage means based on the signal from the signal generator which is inputted thereto, and a sound output means for outputting a sound based on the sound data read by the sound control means.

7. A game system according to claim 6, wherein the sound control means reads the corresponding sound data from the sound data storage means when the signal is inputted from the signal generator within a predetermined time period.

8. A game system according to claim 6, further comprising a replaceable storage member readably storing a display timing data of each instruction mark stored in the image data storage means, a control program of the image control means, a multitude of kinds of sound data to be stored in the sound data storage means and a control program of the sound control means, wherein the data and the programs stored in the storage member are to he stored in the image data storage means and the sound data storage means.

9. A game system according to claim 8, wherein the storage member also stores the background sounds, and the background sounds stored in the storage member are outputted from the sound output means.

10. A game system according to claim 4, wherein the evaluating means evaluates a game result based on a ratio of the number of signals inputted during a predetermined time period from the signal generator to a total number of the at least one instruction mark.

11. A game system according to claim 1, wherein:
the signal generator is operated by the hitting motion and the swinging motion;
the display displays a first instruction mark for the hitting motion and a second instruction mark for the swinging motion on the display screen as the instruction of motion, and
the signal generator generates a first signal corresponding to the hitting motion and a second signal corresponding to the swinging motion as the signal.

12. A game system according to claim 11, wherein the sound control means reads the corresponding sound data from the sound data storage means based on a combination of ON-OFF states of the first and second signals from the signal generator.

13. A game system according to claim 11, wherein two image display areas for displaying the first and second instruction marks while moving them with respect to the reference mark are provided on the right and left sides of the display screen with respect to the game player, and two signal generators are provided on the right and left sides of the game system with respect to the game player.

14. A game system comprising:
a signal generating device having a first curved surface, a second surface opposing said first surface, and a retaining device retaining said first curved surface in a palm of a game player in a glove fitting manner permitting transfer of at least one of a hitting motion and a swinging motion imparted thereto by said game player, the signal generating device including a signal generator, the signal generator including:
a first sensor for sensing an impact of the signal generating device requiring an impact contact of the second surface of the signal generating device with an external object;
a second sensor for sensing an acceleration of the signal generating device;
said first sensor generating a first signal in response to said hitting motion of the game player effecting said impact contact of the second surface of the signal generating device with the external object when said impact is sensed while the game player is in motion with said signal generating device;
said second sensor generating a second signal in response to said swinging motion when said acceleration is sensed while said signal generating device is retained by the game player;
said second signal being indicative of a change in velocity of said signal generating device being moved by said game player, an entirety of said second sensor of said signal generator being movable by the game player from a first location to a second location by movement of said signal generating device retained by the game player, said change in velocity being measured as a difference between a first velocity of said second sensor when at said first location and a second velocity of said second sensor when at said second location; and
said first signal being indicative of a change in a state of said signal generating device being moved by said game player from a third location to a fourth location by movement of said signal generating device retained by the game player, said change in the state being measured as a difference, other than the change in velocity of the first sensor when at said third location and said state when at said fourth location, generated by said impact contact of the second surface of the signal generating device with the external object;
a display having a display screen for displaying and successively renewing an instruction of motion on the display screen;
an evaluating means for evaluating a game result based on a generation timing of the signal; and
a sound generator for outputting at least a background sound.

15. The game system according to claim 14, wherein said display displays a first instruction mark moving along a first virtual line for the hitting motion and a second instruction mark moving along a second virtual line for the swinging motion on the display screen as the instruction of motion.

16. The game system according to claim 15, wherein said first virtual line extends in a vertical direction on the display screen.

17. The game system according to claim 15, wherein said second instruction mark is moved from bottom to top with transversal motion.

18. A game system comprising:
a signal generating device having a first curved surface, a second surface opposing said first surface, and a retaining device retaining said first curved surface in a palm of a game player in above fitting manner permitting transfer of at least one of a hitting motion and a swinging motion imparted thereto by said game player, the signal generating device including a signal generator, the signal generator including:
a first sensor for sensing an impact of the signal generating device requiring an impact contact of the second surface of the signal generating device with an external object;
a second sensor for sensing an acceleration or the signal generating device;
said first sensor generating a first signal in response to said hitting motion of the game player effecting said impact contact of the second surface of the signal generating device with the external object when said impact is sensed while the game player is in motion with said signal generating device;
said second sensor generating a second signal in response to said swinging motion when said acceleration is sensed while said signal generating device is retained by the game player;
said second signal being indicative of a change in velocity of said signal generating device being moved by said game player, an entirety of said second sensor of said signal generator being movable by the game player from a first location to a second location by movement of said signal generating device retained by the game player, said change in velocity being measured as a difference between a first velocity of said second sensor when at said first location and a second velocity of said second sensor when at said second location; and
said first signal being indicative of a change in a state of said signal generating device being moved by said game player from a third location to a fourth location by movement of said signal generating device retained by the game player, said change in the state being measured as a difference, other than the change in velocity of the first sensor when at said third location and said state when at said fourth location, generated by said impact contact of the second surface of the signal generating device with the external object;

a display having a display screen for displaying and successively renewing an instruction of motion on the display screen, said display displaying a first instruction mark moving along a virtual line for the hitting motion and a second instruction mark moving along the virtual line for the swinging motion on the display screen as the instruction of motion;

an evaluating means for evaluating a game result based on a generation timing of the signal; and a sound generator for outputting at least a background sound.

19. A game system comprising:

a signal generating device having a first curved surface, a second surface opposing said first surface, and a retaining device retaining said first curved surface in a palm of a game player in a glove fitting manner permitting transfer of a hitting motion and a swinging motion imparted thereto by said game player, the signal generating device including a signal generator including:
 a first sensor for sensing an impact of the signal generating device requiring an impact contact of the second surface of the signal generating device with an external object, and
 a second sensor for sensing an acceleration of the signal generating device,
 said first sensor generating a first signal in response to the hitting motion of the game player effecting said impact contact of the second surface of the signal generating device with the external object when said impact is sensed while the game player is in motion with said signal generating device,
 said second sensor generating a second signal in response to the swinging motion of the game player while the game player is in motion with said signal generating device, said second signal being indicative of a change in velocity of said signal generating device being moved by said game player, an entirety of said second sensor of said signal generator being movable by the game player from a first location to a second location by movement of said signal generating device retained by the game player, said change in velocity being measured as a difference between a first velocity of said second sensor when at said first location and a second velocity of said second sensor when at said second location,
 said first signal being indicative of a change in a state of said signal generating device being moved by said game player from a third location to a fourth location by movement of said signal generating device retained by the game player, said change in the state being measured as a difference, other than the change in velocity of the first sensor when at said third location and said state when at said fourth location, generated by said impact contact or the second surface of the signal generating device with the external object;

a display having a display screen for displaying and successively renewing an instruction of motion on the display screen, said display displaying a first instruction mark, as an instruction of hitting motion, moving along a first virtual line and a second instruction mark, as an instruction of the swinging motion, moving along a second virtual line, and a first reference mark and a second reference mark such that said first instruction mark moves towards said first reference mark and said second instruction mark moves towards said second reference mark;

an evaluating means for evaluating a game result based on a generation timing of the signal; and a sound generator for outputting at least a background sound.

20. A game system according to claim 13, wherein the two image display areas are provided for a plurality of game players, and the two signal generators are provided for a plurality of game players.

21. A game system according to claim 1, wherein said first sensor is an impact sensor and said second sensor is an acceleration sensor.

22. A game system according to claim 21, wherein said impact sensor includes piezoelectric material such that said piezoelectric material elongates or contracts in response to the impact motion by the game player in a direction from the third location to the fourth location.

23. A game system according to claim 22, wherein said second surface is a bottom surface and said impact sensor detects the impact motion in a direction orthogonal to the bottom surface.

24. A game system according to claim 23, wherein said impact sensor is mounted on a layer provided over the bottom surface and said acceleration sensor is mounted over the impact sensor with a clearance therefrom such that the acceleration sensor is supported on said layer via a plurality of supporting members.

25. A game system according to claim 24, wherein said supporting member include a tubular member on which the acceleration sensor is placed and a screw member which is engaged with the top surface of the acceleration sensor and is inserted through the tubular member and tightened to the layer so that the acceleration sensor is fixed over said impact sensor onto the layer.

26. A game system according to claim 23, wherein said acceleration sensor detects the change in velocity in a direction parallel to the bottom surface.

27. A game system according to claim 21, wherein a motion detecting direction of said acceleration sensor is substantially orthogonal to a motion detection direction of said impact sensor.

28. A game system according to claim 21, wherein the motion by the player is judged by the ON/OFF states of the acceleration sensor and the impact sensor.

29. A game system according to claim 28, wherein the motion by the player is judged to be the swinging motion when only the acceleration sensor is ON and the motion by the player is judged to be the hitting motion when the impact sensor is ON state regardless of the ON/OFF state of the acceleration sensor.

* * * * *

UNITED STATES PATENT AND TRADEMARK OFFICE
CERTIFICATE OF CORRECTION

PATENT NO.         : 7,070,500 B1
APPLICATION NO.    : 09/655511
DATED              : July 4, 2006
INVENTOR(S)        : Mitsuhiro Nomi et al.

It is certified that error appears in the above-identified patent and that said Letters Patent is hereby corrected as shown below:

This is a Request for a Certificate of Correction for the U.S. Patent and Trademark Office to correct the U.S. Letters Patent by adding the names of the two inventors as indicated below to the names of the inventors appearing on the issued patent:
On The Title Page, After 3rd Inventor Please add to Item (75)
　　　　Yoshinobu Kitami, Kobe (JP);
　　　　Tasashi Kadohori, Akashi (JP).

Signed and Sealed this

Fourteenth Day of November, 2006

JON W. DUDAS
*Director of the United States Patent and Trademark Office*